(12) United States Patent
Bleyer et al.

(10) Patent No.: US 10,868,980 B1
(45) Date of Patent: Dec. 15, 2020

(54) PARALLAX CORRECTION USING CAMERAS OF DIFFERENT MODALITIES

(71) Applicant: MICROSOFT TECHNOLOGY LICENSING, LLC, Redmond, WA (US)

(72) Inventors: Michael Bleyer, Seattle, WA (US); Christopher Douglas Edmonds, Carnation, WA (US); Raymond Kirk Price, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/696,620

(22) Filed: Nov. 26, 2019

(51) Int. Cl.
*H04N 5/33* (2006.01)
*H04N 5/225* (2006.01)
(Continued)

(52) U.S. Cl.
CPC .............. *H04N 5/33* (2013.01); *G02B 27/017* (2013.01); *G06T 7/593* (2017.01); *G06T 19/006* (2013.01); *H04N 5/2258* (2013.01); *H04N 13/239* (2018.05); *H04N 13/254* (2018.05); *G02B 2027/014* (2013.01); *G06T 2207/10012* (2013.01); *G06T 2207/10048* (2013.01); *H04N 2013/0081* (2013.01)

(58) Field of Classification Search
CPC ................................ H04N 5/33; H04N 5/2258
See application file for complete search history.

(56) References Cited

U.S. PATENT DOCUMENTS 6,911,652 B2 6/2005 Walkenstein
8,138,991 B2 * 3/2012 Rorberg ................. H04N 5/772
345/8
(Continued)

FOREIGN PATENT DOCUMENTS

CN 101111748 B 12/2014

OTHER PUBLICATIONS

Kan, Michael, "Microsoft CEO Defends Supplying HoloLens Tech to US Army", Retrieved from: https://www.pcmag.com/news/366785/microsoft-ceo-defends-supplying-hololens-tech-to-us-army, Feb. 25, 2019, 5 Pages.
(Continued)

*Primary Examiner* — Paulos M Natnael
(74) *Attorney, Agent, or Firm* — Workman Nydegger

(57) ABSTRACT

Enhanced passthrough images are generated and displayed. A current visibility condition of an environment is determined. Based on the current visibility condition, a first camera or a second camera, which detect light spanning different ranges of illuminance, is selected to generate a passthrough image of the environment. The selected camera is then caused to generate the passthrough image. Additionally, a third camera, which is structured to detect long wave infrared radiation, is caused to generate a thermal image of the environment. Parallax correction is performed by aligning coordinates of the thermal image with corresponding coordinates identified within the passthrough image. Subsequently, the parallax-corrected thermal image is overlaid onto the passthrough image to generate a composite passthrough image, which is then displayed.

20 Claims, 25 Drawing Sheets

(51) Int. Cl.
*G02B 27/01* (2006.01)
*G06T 19/00* (2011.01)
*H04N 13/239* (2018.01)
*H04N 13/254* (2018.01)
*G06T 7/593* (2017.01)
*H04N 13/00* (2018.01)

(56) References Cited

U.S. PATENT DOCUMENTS

| | | | |
|---|---|---|---|
| 8,836,793 B1 | 9/2014 | Kriesel et al. | |
| 9,277,143 B2 * | 3/2016 | Schmidt | H04N 5/2253 |
| 10,142,560 B2 * | 11/2018 | Venkataraman | H04N 9/045 |
| 10,165,949 B2 | 1/2019 | Tzvieli et al. | |
| 2007/0247517 A1 | 10/2007 | Zhang et al. | |
| 2008/0029714 A1 * | 2/2008 | Olsen | G02B 7/04 |
| | | | 250/475.2 |
| 2013/0278635 A1 * | 10/2013 | Maggiore | G06T 19/006 |
| | | | 345/633 |
| 2018/0307310 A1 * | 10/2018 | McCombe | H04N 5/23229 |
| 2019/0212828 A1 * | 7/2019 | Kin | G06F 3/04815 |
| 2019/0297316 A1 | 9/2019 | Bleyer et al. | |

OTHER PUBLICATIONS

Kudou, Sousuke, "Head-mounted Display Equipped with Infrared Camera", Retrieved from: https://tech.nikkeibp.co.jp/dm/atclen/news_en/15mk/072401474/, Jul. 25, 2017, 3 Pages.

* cited by examiner

PARALLAX CORRECTION USING CAMERAS OF DIFFERENT MODALITIES

BACKGROUND

Mixed-reality (MR) systems/devices include virtual-reality (VR) and augmented-reality (AR) systems. Conventional VR systems create completely immersive experiences by restricting users' views to only virtual images rendered in VR scenes/environments. Conventional AR systems create AR experiences by visually presenting virtual images that are placed in or that interact with the real world. As used herein, VR and AR systems are described and referenced interchangeably via use of the phrase "MR system." As also used herein, the terms "virtual image," "virtual content," and "hologram" refer to any type of digital image rendered by an MR system. Furthermore, it should be noted that a head-mounted device (HMD) typically provides the display used by the user to view and/or interact with holograms or display content provided within an MR scene.

Some MR systems have been developed to generate a so-called "passthrough" visualization of a user's real-world environment. For instance, in the context of a VR system, which completely obstructs a user's view of the real world, passthrough visualizations may be provided to display images of the environment to the user so the user need not have to remove the HMD. The passthrough visualizations are designed to mimic what a user would see if the user were not actually wearing the HMD. As the user moves his/her head or eyes, the passthrough visualizations are updated to display images reflective of what the user would have seen in the real-world without the HMD. In the context of an AR system, passthrough visualizations may be provided to enhance the user's view of his/her real-world environment by emphasizing certain identified objects within the real-world. Accordingly, as used herein, any type of MR system, including an AR system and a VR system, may be used to generate passthrough visualizations.

While some technologies are available for generating passthrough visualizations, the current technologies are seriously lacking. In particular, the current technology fails to optimize passthrough visualizations to better identify objects within the user's environment. Additionally, the current technology fails to account for situations in which the visibility of the environment is poor (e.g., perhaps the environment is filled with smoke). If the visibility is poor, then the resulting passthrough visualizations are also likely to be very low in quality, or perhaps even useless to the user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to systems, methods, and devices (e.g., hardware storage devices, wearable devices, etc.) that enhance passthrough visualizations.

In some embodiments, a current visibility condition of an environment is determined. Based on the current visibility condition, a first camera, which is configured to detect or be sensitive to light spanning a first range of illuminance, or alternatively a second camera, which is configured to detect or be sensitive to light spanning a second range of illuminance, is selected to generate a passthrough image of the environment. The selected camera then actually generates the passthrough image. Additionally, a third camera, which is configured to detect long wave infrared radiation, generates a thermal image of the environment. Parallax correction is then performed by aligning coordinates of the thermal image with corresponding coordinates identified within the passthrough image. Optionally, the parallax-corrected thermal image (or at least portions thereof) is overlaid onto the passthrough image (which may have been reprojected) to generate a composite passthrough image, which may then be displayed. In any event, at least a portion of the parallax-corrected thermal image is displayed.

In some embodiments, based on the current visibility conditions, a determination is made that neither one of the first or second cameras is usable to generate a passthrough image having an image quality that satisfies a required image quality threshold. In response to this determination, the third camera generates a thermal image of the environment. Planar reprojection is then performed on the thermal image. The planar reprojection process is performed by selecting, relative to a display, a perspective distance at which to project the thermal image. The planar reprojection is also performed by projecting the thermal image to the selected perspective distance to cause a perspective plane of the projected thermal image to have an appearance as though the perspective plane has a depth corresponding to the selected perspective distance (e.g., relative to the display). The projected thermal image is then displayed on the display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
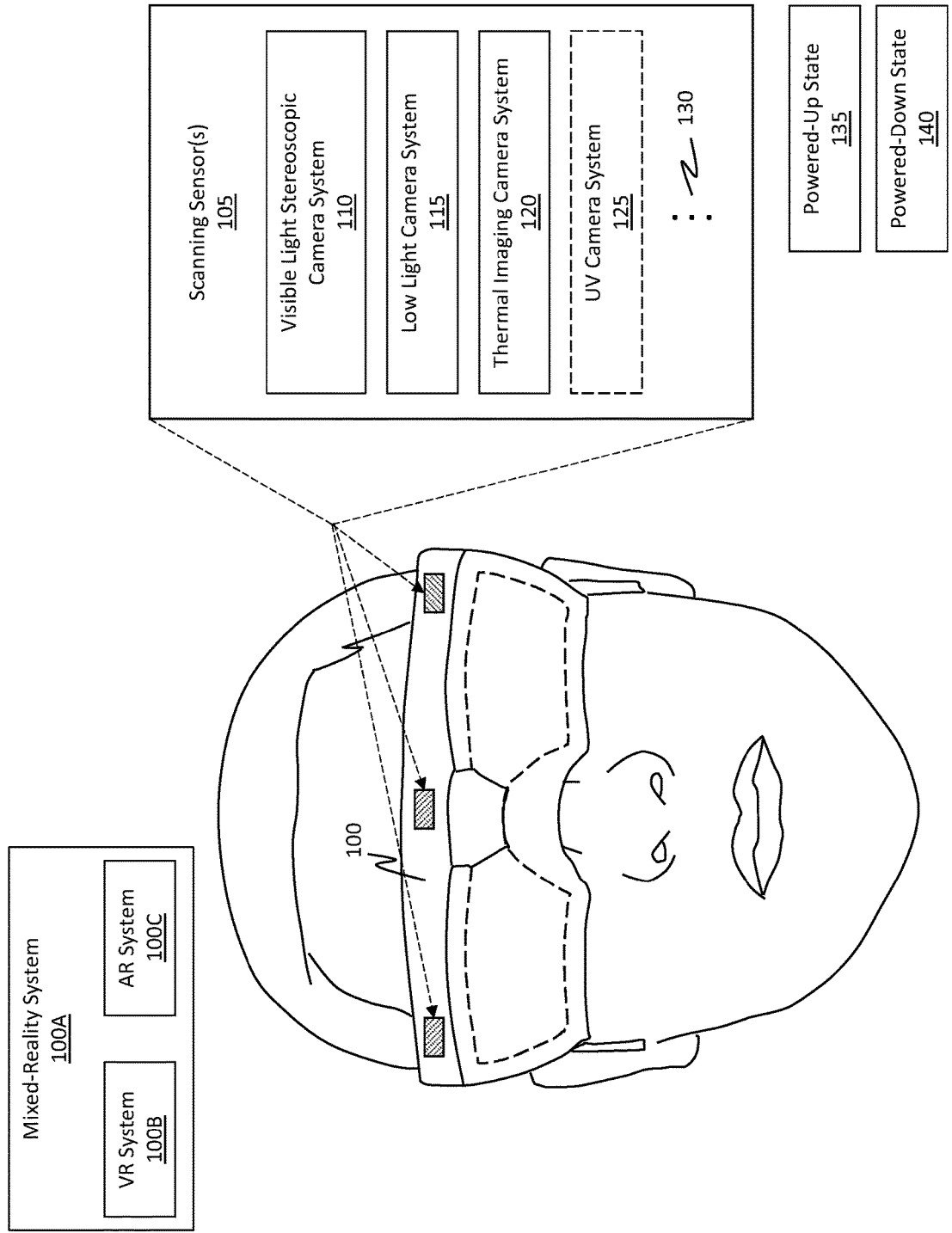
FIG. 1 illustrates an example of an HMD structured to perform any of the disclosed operations, where the HMD includes any number or combination of visible light cameras, which are capable of detecting light in the visible spectrum as well as the infrared light spectrum, low light cameras, which are also capable of detecting light in the visible spectrum as well as the infrared light spectrum, and thermal imaging cameras.

The disclosed embodiments relate to systems, methods, and devices (e.g., hardware storage devices, wearable devices, etc.) that enhance passthrough visualizations.

In some embodiments, a visibility condition of an environment is determined. Based on that condition, a first camera, which is configured to detect light spanning a first range of illuminance, or alternatively a second camera, which is configured to detect light spanning a second range of illuminance, is selected to generate a passthrough image (or multiple passthrough images, one image for each one of the user's eyes). The selected camera generates the passthrough image. A third camera, which is configured to detect long wave infrared radiation, generates a thermal image of the environment. Parallax correction is performed by aligning coordinates of the thermal image with corresponding coordinates identified within the passthrough image. The parallax-corrected thermal image (or at least portions thereof) may optionally be overlaid onto the passthrough image to generate a composite passthrough image, which is optionally displayed. In any event, at least a portion of the parallax-corrected thermal image is displayed.

In some embodiments, based on the visibility condition, a determination is made that neither one of the first or second cameras is usable to generate an adequate passthrough image. In response, the third camera generates a thermal image of the environment. Planar reprojection is performed on the thermal image by selecting, relative to a display, a perspective distance at which to project the thermal image and by projecting the thermal image to the selected perspective distance. As a consequence, the perspective plane of the projected thermal image has an appearance as though the perspective plane has a depth corresponding to the selected perspective distance relative to the display. The projected thermal image is then displayed on the display.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements The disclosed embodiments bring about substantial benefits to the technology by generating enhanced passthrough visualizations and by directly improving the user's experience with the computer system. In particular, the embodiments are able to merge, fuse, overlay, or otherwise combine different types of image data into a composite "passthrough" image. This composite passthrough image is an enhanced image because it provides additional information that would not be available if only one of the different types of image data were used. That is, the embodiments provide a synergistic effect by combining multiple different types of data to provide substantial benefits beyond which any one of those data types would be capable of providing.

Additionally, by providing an enhanced passthrough visualization, the embodiments directly and substantially improve the user's experience. That is, as a result of the synergistic effect described above, the user is provided with enhanced data, which will improve the user's experience with the computer system. Now, the user will be able to view and observe content that was not previously available for him/her to view. Having this enhanced content will enable the user to utilize the computer system in new scenarios and in a dynamic manner.

Example HMDs & Scanning Systems

Attention will now be directed to FIG. 1, which illustrates an example of a head-mounted device (HMD) 100. HMD 100 can be any type of MR system 100A, including a VR system 100B or an AR system 100C. It should be noted that while a substantial portion of this disclosure is focused on the use of an HMD to scan an environment to provide a passthrough visualization (aka passthrough image), the embodiments are not limited to being practiced using only an HMD. That is, any type of scanning system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate images of any kind of environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualization of the user's environment. As described earlier, a "passthrough" visualization refers to a visualization that reflects what the user would see if the user were not wearing the HMD 100, regardless of whether the HMD 100 is included as a part of an AR system or a VR system. To generate this passthrough visualization, the HMD 100 may use its scanning sensor(s) 105 to scan, map, or otherwise record its surrounding environment, including any objects in the environment, and to pass that data on to the user to view. The passed-through data is modified to reflect or to correspond to a perspective of the user's pupils.

To do so, the scanning sensor(s) 105 typically rely on its cameras (e.g., head tracking cameras, hand tracking cameras, depth cameras, or any other type of camera) to obtain one or more raw images of the environment. In addition to generating passthrough images, these raw images may also be used to determine depth data detailing the distance from the sensor to any objects captured by the raw images (e.g., a z-axis range or measurement). Once these raw images are obtained, then a passthrough visualization can be generated, and a depth map can also be computed from the depth data embedded or included within the raw images.

As used herein, a "depth map" details the positional relationship and depths relative to objects in the environment. Consequently, the positional arrangement, location, geometries, contours, and depths of objects relative to one another can be determined. From the depth maps (and possibly the images), a 3D representation of the environment can be generated.

Relatedly, from the passthrough visualizations, a user will be able to perceive what is currently in his/her environment without having to remove the HMD 100. Furthermore, as will be described in more detail, the disclosed passthrough visualizations will also enhance the user's ability to view objects within his/her environment. It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include a visible light stereoscopic camera system 110, a low light camera system 115, a thermal imaging camera system 120, and potentially (though not necessarily) an ultraviolet (UV) camera system 125. The ellipsis 130 demonstrates how any other type of camera system (e.g., depth cameras, time of flight cameras, etc.) may be included among the scanning sensor(s) 105. As an example, a particular camera structured to detect mid-infrared wavelengths (to be discussed in more detail later) may be included within the scanning sensor(s) 105. In some cases, the thermal imaging camera may be this "particular" camera or the low light camera may be this "particular" camera.

Generally, a human eye is able to perceive light within the so-called "visible spectrum," which includes light (or rather, electromagnetic radiation) having wavelengths ranging from about 380 nanometers (nm) up to about 740 nm. As used herein, the visible light stereoscopic camera system 110 includes two or more red, green blue (RGB) cameras or monochrome (black and white) cameras structured to capture light photons within the visible spectrum and/or the infrared light spectrum. In some cases, the visible light stereoscopic camera system 110 includes combinations of RGB cameras and monochrome cameras. Often, these visible light cameras (i.e. RGB cameras and/or monochrome cameras) are complementary metal-oxide-semiconductor (CMOS) type cameras, though other camera types may be used as well (e.g., charge coupled devices, CCD). Accordingly, as indicated above, reference to a "visible" light camera should be interpreted broadly as covering both RGB cameras, monochrome cameras, or any combination thereof and should further be interpreted as being able to detect both visible light and infrared light. In this regard, the visible light stereoscopic camera system 110 includes visible light cameras.

The fields of view of the two or more visible light cameras typically at least partially overlap with one another. With this overlapping region, images generated by the visible light stereoscopic camera system 110 can be used to identify disparities between common pixels in the resulting overlapping images. Based on these pixel disparities, the embodiments are able to determine depths for objects located within the overlapping region. As such, the visible light stereoscopic camera system 110 can be used to not only generate passthrough visualizations, but it can also be used to determine object depth. In some embodiments, the monochrome visible light cameras may or may not include a blocking filter to block out IR light. Additionally, the visible light cameras are often structured as low power cameras (with relatively smaller pixels) that run all or a majority of the time the HMD is operating and that perform sufficiently well in daylight conditions.

The low light camera system 115 is structured to capture visible light and IR light. These cameras are typically silicon-based detectors and are sensitive within the wavelength range spanning between 350 nm and about 1100 nm. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 8 μm to 30 μm). As expected, mid-IR has energy values in between or in the middle of the near-IR and far-IR ranges. The low light camera system 115 is structured to detect or be sensitive to visible and near IR light.

In some embodiments, the visible light cameras and the low light cameras (i.e. low light night vision cameras) operate in approximately the same overlapping wavelength range. In some cases, this overlapping wavelength range is between about 400 nanometers and about 1,000 nanometers. Additionally, in some embodiments these two types of cameras are both silicon detectors.

One distinguishing feature between these two types of cameras is related to the illuminance conditions in which they actively operate or in which they are triggered to operate. In some cases, the visible light cameras are low power cameras and operate in environments where the illuminance is between about 10 lux and about 100,000 lux, or rather, the range begins at about 10 lux and increases beyond 10 lux. In contrast, the low light cameras consume more power and operate in environments where the illuminance range is between about 1 milli-lux and about 10 lux. In some cases, the low light cameras operate to detect wavelengths within the range of 350 nm to 1100 nm, corresponding to an absorption range of silicon. In this regard, the different types of cameras may be triggered based on the detected ambient light conditions of the environment. As described earlier, in some embodiments, the visible light cameras are able to detect or be sensitive to both visible light and IR light, and the low light cameras are able to detect or be sensitive to both visible light and IR light.

The thermal imaging camera system 120, on the other hand, is structured to detect electromagnetic radiation in the far-IR (i.e. thermal-IR) range, though some embodiments also enable the thermal imaging camera system 120 to detect radiation in the mid-IR range. To clarify, the thermal imaging camera system 120 may be a long wave infrared imaging camera structured to detect electromagnetic radiation by measuring long wave infrared wavelengths. That is, the thermal imaging camera system 120 often detects IR radiation having wavelengths between about 8 microns and 14 microns. In some cases (though not all), the thermal imaging camera system 120 includes an uncooled thermal imaging sensor.

An uncooled thermal imaging sensor uses a specific type of detector design that is based on a bolometer, which is a device that measures the magnitude or power of an incident electromagnetic wave/radiation. To measure the radiation, the bolometer uses a thin layer of absorptive material (e.g., metal) connected to a thermal reservoir through a thermal link. The incident wave strikes and heats the material. In response to the material being heated, the bolometer can detect a temperature-dependent electrical resistance. That is, changes to environmental temperature causes changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the far-IR spectrum all the way up to millimeter-sized waves.

The UV camera system 125 is structured to capture light in the UV range. The UV range includes electromagnetic radiation having wavelengths between about 10 nm and about 400 nm. The disclosed UV camera system 125 should be interpreted broadly and may be operated in a manner that includes both reflected UV photography and UV induced fluorescence photography.

FIG. 1 also shows a powered-up state 135 and a powered-down state 140. Generally, the low light camera system 115, the thermal imaging camera system 120, and the UV camera system 125 (if present) consume relatively more power than the visible light stereoscopic camera system 110. Therefore, when not in use, the low light camera system 115, the thermal imaging camera system 120, and the UV camera system 125 are typically in the powered-down state 140 in which the camera system is either turned off (and thus consuming no power) or in a reduced operability mode (and thus consuming substantially less power than if the camera system were turned on). In contrast, the visible light stereoscopic camera system 110 is typically in the powered-up state 135 in which the camera system is fully operational.

Figure 2A:
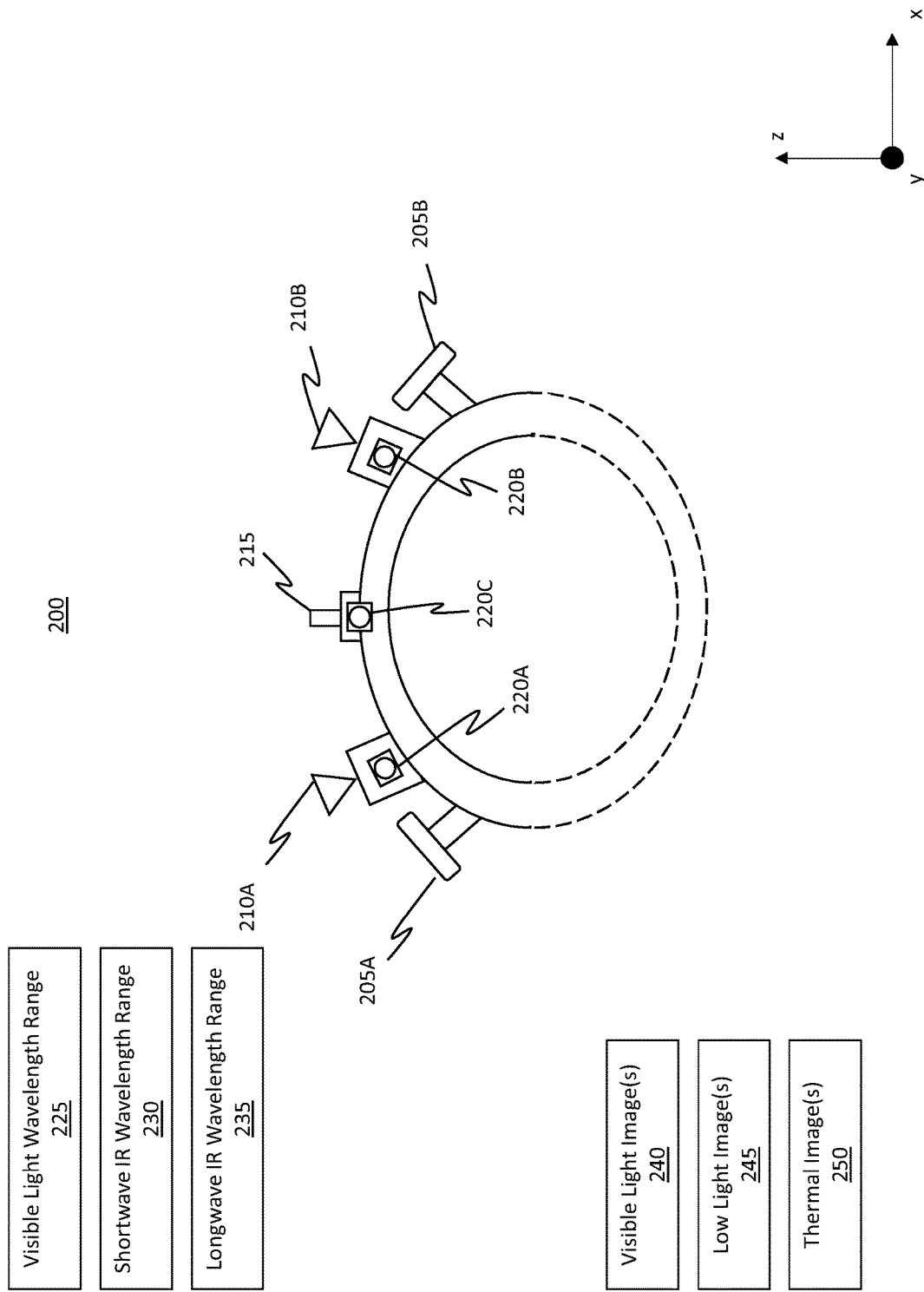
FIG. 2A illustrates an example of an HMD comprising multiple different types of cameras.

FIG. 2A shows an example HMD 200, which is representative of the HMD 100 from FIG. 1. HMD 200 includes a first visible light camera 205A and a second visible light camera 205B (i.e. a pair of visible light cameras), a first low light camera 210A and a second low light camera 210B (i.e. a pair of low light cameras), and a thermal imaging camera 215. The first and second visible light cameras 205A and 205B may be included in the visible light stereoscopic camera system 110 from FIG. 1. Similarly, the first and second low light cameras 210A and 210B may be included in the low light camera system 115, and the thermal imaging camera 215 may be included in the thermal imaging camera system 120.

As used here, reference to a "first" camera or camera type generally refers to one of the visible light cameras; reference to a "second" camera or camera type generally refers to one of the low light cameras; and reference to a "third" camera generally refers to the thermal imaging camera. Additionally, the "first" camera may be one of a pair of head tracking or other type of visible light cameras; the "second" camera may be one of a pair of low light cameras, and the "third" camera may be a single long wave infrared imaging camera. In some cases, the system further includes a thermal imager configured to detect temperatures with a minimum NEDT (noise equivalent delta temperature) of about 20 mKelvin.

As used herein, reference to "head tracking cameras" (or, more generally to visible light cameras) are cameras that are primarily used for computer vision to perform head tracking. These cameras can detect visible light, or even a combination of visible and IR light (e.g., a range of IR light, including 850 nm IR light). In some cases, these cameras are global shutter devices with pixels being 3 μm in size. Low light cameras are cameras that are sensitive to visible light and near-IR. These cameras are larger and may have pixels that are 8 μm in size or larger. These cameras are also sensitive to wavelengths that silicon is sensitive to, which are between about 350 nm to 1100 nm. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras that detect electromagnetic radiation in the mid-IR range. These cameras comprise non-silicon materials (e.g., InP or InGaAs) that detect light in the 800 nm to 2 μm wavelength range).

In some cases, the first low light camera 210A includes a switch 220A (e.g., a user-controlled switch) that is selectable (e.g., by the user) to activate or deactivate the first low light camera 210A (e.g., to transition the camera between the powered-up state 135 and the powered-down state 140 mentioned in FIG. 1). Similarly, the second low light camera 210B may include a corresponding switch 220B, and the thermal imaging camera 215 may include a corresponding switch 220C. These switches may be used to activate or deactivate those devices.

In some embodiments, a single switch may be used to simultaneously activate or deactivate both of the first and second low light cameras 210A and 210B. In some embodiments, a single switch may be used to simultaneously activate or deactivate the first and second low light cameras 210A and 210B as well as the thermal imaging camera 215. In some embodiments, the various different cameras may be activated or deactivated automatically in response to certain triggering conditions (e.g., visibility conditions). Further detail on when the different cameras are used will be provided later.

As shown by the x-y-z legend, which illustrates how the HMD 200 is being viewed from a top aerial or bird's eye perspective, the various different cameras are positioned on the HMD 200 so as to be focused generally outward in the depth or "z" direction. That is, the "y" direction can be considered as the gravity vector, and the "z" direction is orthogonal to both the "y" and the "x" direction.

The first and second visible light cameras 205A and 205B capture light in the visible light wavelength range 225, which was described earlier (i.e. the visible spectrum), and operate when the environment's illuminance is in the lux range specified earlier. Similarly, the first and second low light cameras 210A and 210B capture light in the shortwave IR wavelength range 230 (i.e. the near-IR range) and operate when the environment's illuminance is in the lux range specified earlier, and the thermal imaging camera 215 captures light in the longwave IR wavelength range 235 (i.e. the far-IR range, and sometimes also the mid-IR range). Generally, the longwave IR wavelength range 235 will include wavelengths starting at about 8 microns and extending up to the far-IR range. In some embodiments, the longwave IR wavelength range 235 is between about 8 microns and about 14 microns.

Based on the above disclosure, one will appreciate that the first and second visible light cameras 205A and 205B generate visible light image(s) 240 (i.e. RGB images, monochrome images, or combinations thereof). Similarly, the first and second low light cameras 210A and 210B generate low light image(s) 245 while the thermal imaging camera 215 generates thermal image(s) 250.

Figure 2B:
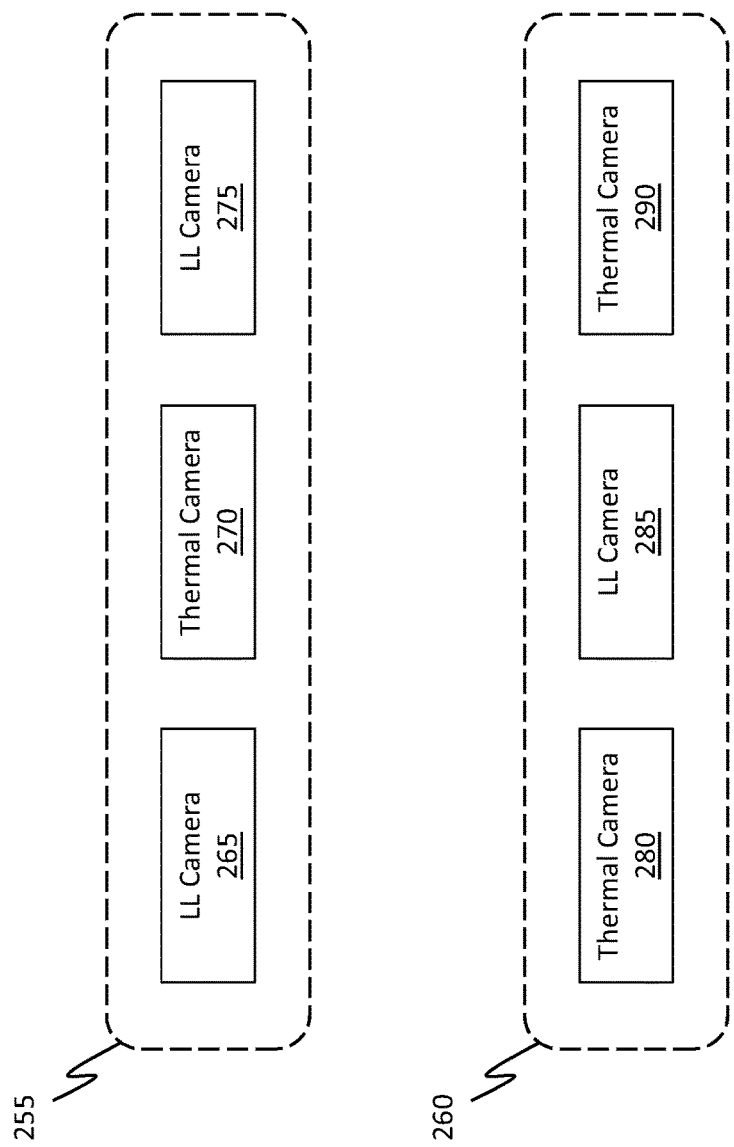
FIG. 2B illustrates different camera configurations that may be used on the HMD, including a pair of low light (LL) cameras and a thermal camera or a pair of thermal cameras and a LL camera, as well as other combinations of LL cameras, thermal cameras, and visible light cameras.

FIG. 2B illustrates two different configurations (e.g., configuration 255 and configuration 260). Configuration 255 is representative of the configuration shown in FIG. 2A in which a first low light (LL) camera 265 is used, a single thermal imaging camera 270 is used, and a second LL camera 275 is used. Configuration 260, on the other hand, shows how a first thermal imaging camera 280 is used, a single LL camera 285 is used, and a second thermal imaging camera 290 is used. Based on this disclosure, one will appreciate that the embodiments are not limited in the number of LL cameras that may be used or in the number of thermal imaging cameras that may be used. Indeed, any number of these cameras may be used (e.g., 1, 2, 3, 4, 5, 6, 7, 8, 9, 10, and so forth).

Generating Passthrough Visualizations

FIGS. 3A through 3F illustrate various techniques for generating a passthrough visualization. Often, one or more different software-based programmatic transforms and/or corrections will be applied to an initial image in order to modify/transform that image so it may be viewed in a comfortable manner by a user.

Figure 3A:
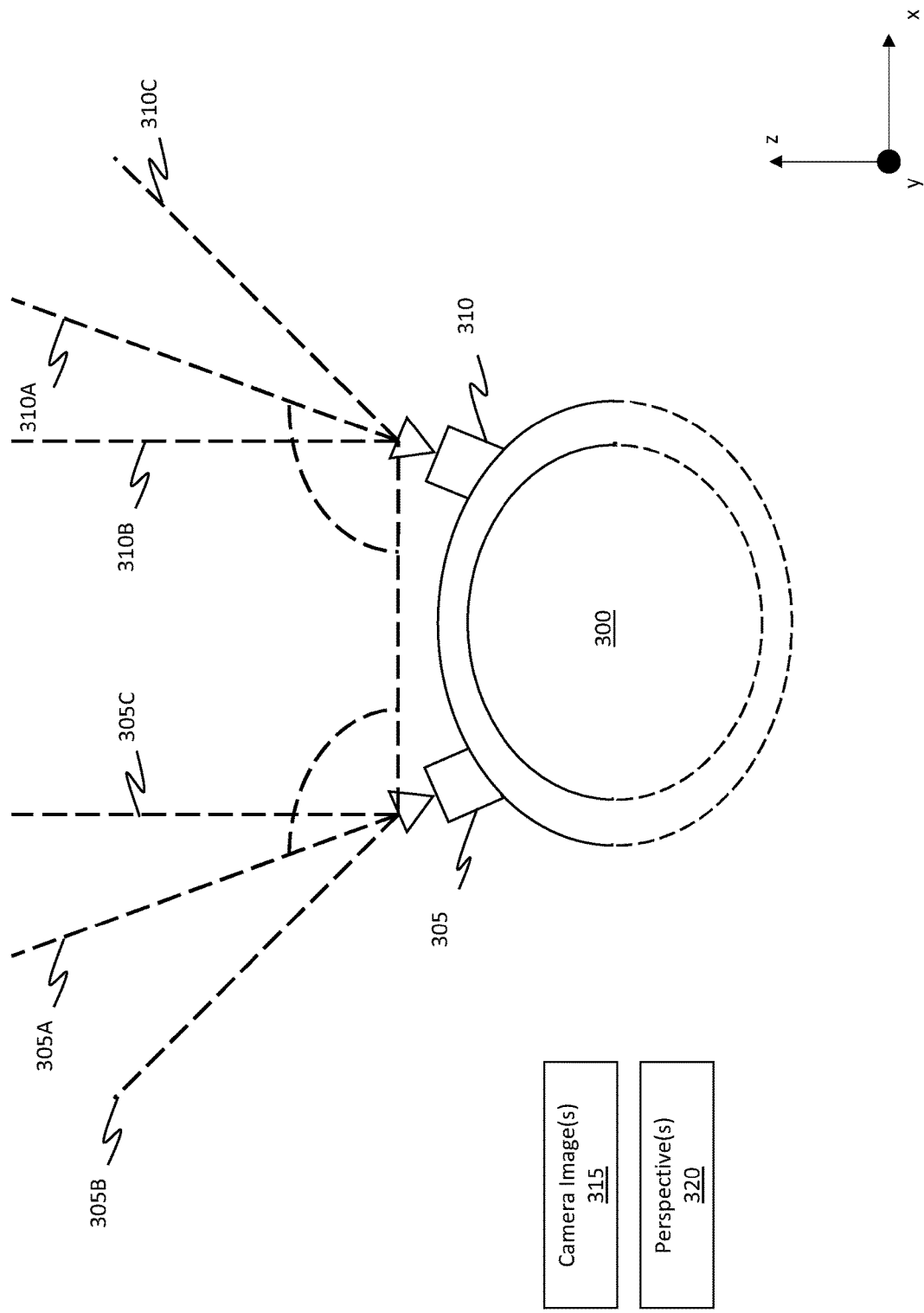
FIGS. 3A, 3B, 3C, 3D, 3E, and 3F illustrate various corrections and transforms that may be applied to an image to convert that image into a passthrough image.

Turning first to FIG. 3A, there is shown an example HMD 300, which is representative of the HMD 200 from FIG. 2A. HMD 300 is shown as including a first camera 305 and a second camera 310. One will appreciate that these cameras may be of any type, including visible light cameras, low light (LL) cameras, thermal imaging cameras, UV cameras, and so forth. The x-y-z legend also illustrates how the perspective of HMD 300 is similar to the perspective of HMD 200 of FIG. 2A. In this case, only two cameras are illustrated, but any number of cameras may be disposed on the HMD 300.

Camera 305 is shown as including an optical axis 305A. For reference, a camera's optical axis is an imaginary "line" that passes through the direct center of the camera's lens, and it is akin to the point where the camera is being aimed. Relatedly, camera 305 has a field of view defined by the lines 305B and 305C.

Camera 310 is structured in a similar manner and includes an optical axis 310A and a field of view defined by the lines 310B and 310C. The cameras 305 and 310 are able to generate any number of camera image(s) 315 based on their current perspective(s) 320 (i.e. the direction in which the cameras 305 and 310 are being aimed as well as the configuration of the different fields of view).

As shown in FIG. 3A, the optical axes 305A and 310A are not parallel to one another (i.e. have a non-parallel alignment) and instead are angled with respect to one another. The angles may be set to any angle, without limit. FIG. 3A shows how the cameras 305 and 310 are angled relative to one another in the z-axis direction, but the cameras 305 and 310 may also be angled relative to one another in the y-axis direction. That is, one camera may be angled slightly more downward (e.g., a selected degree or angle offset downward) while another camera may be angled slightly more upward (e.g., a selected degree or angle offset upward). In other embodiments, both cameras are angled slightly downward relative to the y-axis direction (e.g., a selected degree or angle offset downward) while in other embodiments both cameras are angled slightly upward relative to the y-axis direction (e.g., a selected degree or angle offset upward).

Because the two cameras 305 and 310 are not aligned (i.e. are not in parallel) with one another, various different transforms may be applied to the resulting camera image(s) 315 in order to ensure that those camera image(s) 315, when displayed to a user, with be viewed in a comfortable manner. To clarify, if the camera image(s) 315 were displayed to the user without any modifications, then the user will experience discomfort because the images will not be in alignment with the user's pupils. Instead of being aligned with the user's pupils (which will lead to a comfortable viewing experience for the user), the camera image(s) 315 are taken from the perspective of their current positioning on the HMD 300. At their current positioning, the cameras 305 and 310 are spaced apart farther than a human user's typical interpupil distance, and the cameras 305 and 310 are angled outward. As a result of this positioning, the perspective(s) 320 embodied within the camera image(s) 315 are significantly out of alignment relative to what a user would see if the HMD 300 were not present. To align the camera image(s) 315 to the user's pupils, different transforms are applied, as will now be described in FIGS. 3B through 3F.

Figure 3B:
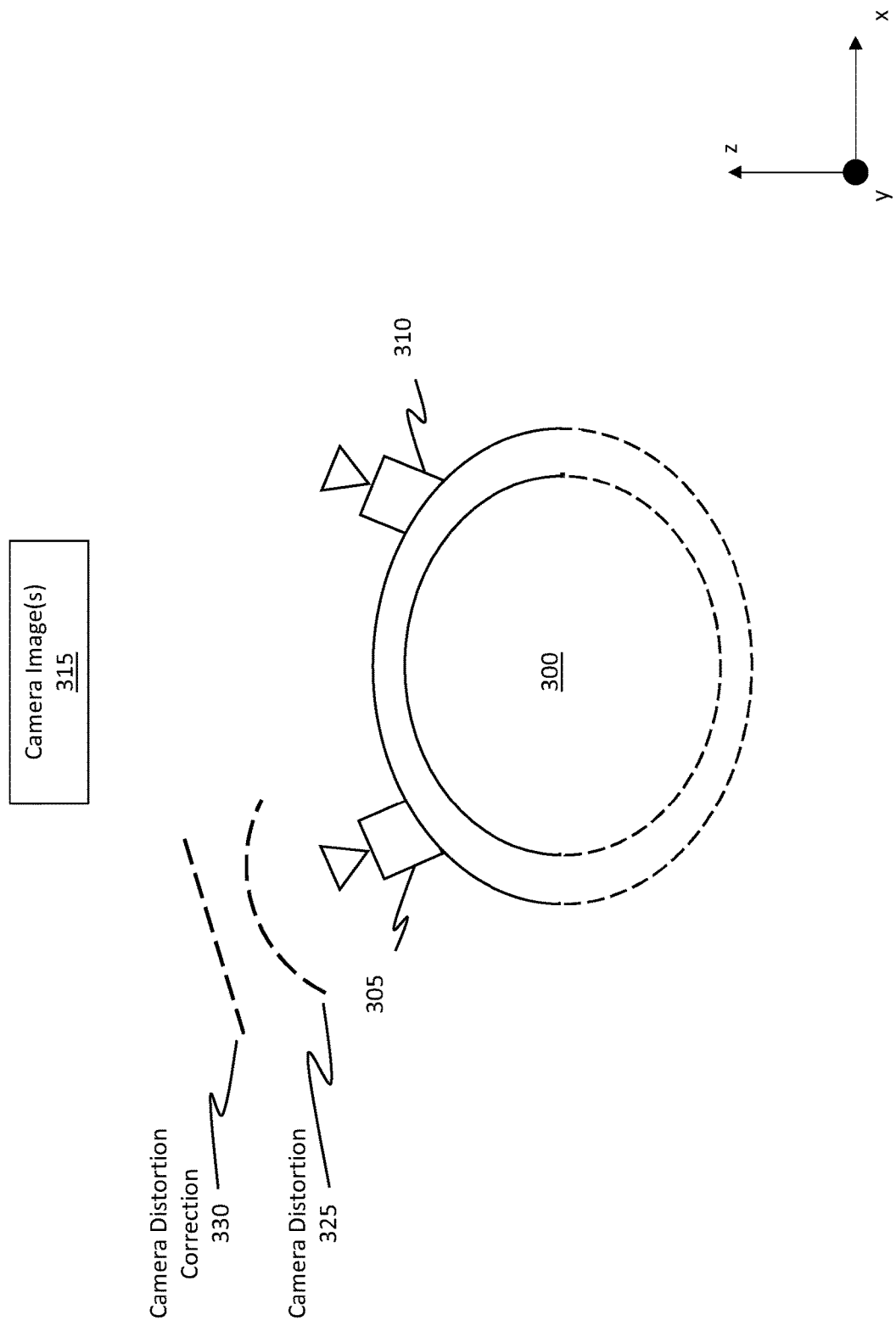

FIG. 3B shows a transform or correction that may be applied to the camera image(s) 315 that are initially generated by the cameras 305 and 310. In some cases, cameras 305 and 310 may be wide angled cameras or some other type of cameras. For instance, the lenses on the cameras 305 and 310 may have a convex shape, a concave shape, or some other kind of distorting shape. Such distortions cause the resulting camera image(s) 315 to also have various distortions (e.g., the images may portray curved lines when straight lines should be present). Examples of such distortions include barrel distortions, pincushion distortions, flare, ghosts, spherical aberrations, chromatic aberrations, coma aberrations, and astigmatisms. Generally, the camera distortion 325 refers to any type of distortion that may be present in the camera image(s) 315 due to the configuration of the cameras 305 and 310 (e.g., due to shutter speed, resolution, brightness abilities, intensity abilities, and/or exposure properties).

The disclosed embodiments are configured to compensate for the camera distortion 325 by performing a camera distortion correction 330 (or any number of corrections, as needed based on the number of detected distortions). The camera distortion correction 330 may include optimizations to correct for distortions related to barrel distortion, pincushion distortion, flare, ghosts, spherical aberrations, chromatic aberrations, coma aberrations, astigmatisms, shutter speed, resolution, brightness abilities, intensity abilities, and/or exposure properties. While the above description detailed a few corrections that may be applied, it will be appreciated that the present embodiments are able to correct for any type of camera distortion 325. Accordingly, the present embodiments are able to perform one or more camera distortion correction 330 in an effort to generate an image that accurately reflects the real-world environment.

Figure 3C:
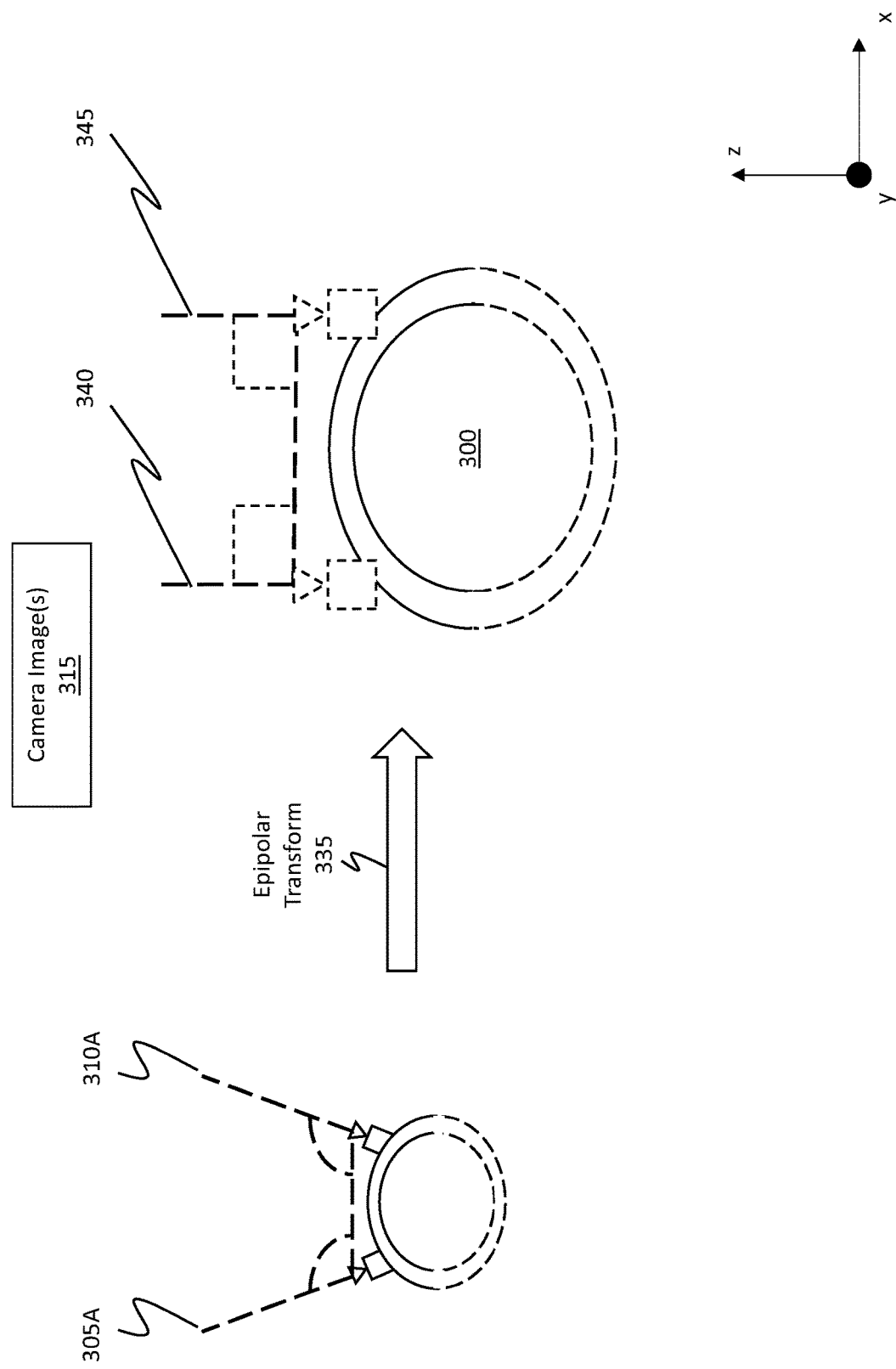

FIG. 3C describes an epipolar transform 335, which aligns the optical axes (e.g., 305A and 310A) of the cameras to have a parallel alignment, or an alignment matching/corresponding to an alignment of a user's pupils, which is generally (but not perfectly) parallel. The epipolar transform 335 is often performed subsequent to the camera distortion correction 330 of FIG. 3B.

As shown in FIG. 3C, a programmatic epipolar transform 335 causes the optical axis 305A to be transformed to have an alignment as shown by optical axis 340 and causes the optical axis 310A to be transformed to have an alignment as shown by optical axis 345. In this manner, the epipolar transform 335 programmatically alters/re-aligns the perspective of the camera image(s) 315 so that the perspective appears as though those camera image(s) 315 were captured using cameras having parallel (or near parallel or at least corresponding to an alignment of human eyes) optical axes. To perform the epipolar transform 335, the embodiments perform one or more rotational transforms, translation transforms, and/or scaling transforms. Rotational transforms, translation transforms, and scaling transforms are generally known in the art and will not be discussed in depth in this disclosure.

After the camera distortion correction 330 of FIG. 3B and after the epipolar transform 335 of FIG. 3C are performed, the embodiments then generate a depth map. Often, this depth map is comprised of a plurality of three-dimensional coordinates, where each three-dimensional coordinate corresponds to a single pixel included within a plurality of pixels that together form a particular image. This particular image is generated by combining together (1) a left image that has undergone both a camera distortion correction and an epipolar transform and (2) a right image that has undergone both a camera distortion correction and an epipolar transform. As a consequence, the depth map maps distances between the stereo camera pair and objects that are located in the surrounding environment.

It will be appreciated that the depth map can be considered as a disparity estimation. Just like how a human perceives depth by analyzing the disparity between a vision captured by a left eye and a vision captured by a right eye, image depth may be computed by analyzing and estimating the disparity present between two camera images. The depth map may include pixel depth coordinates and/or depth transform data used to identify the relative depth of each pixel rendered in the transformed images. In some embodiments, the depth map is a partial depth map that only includes a limited set of pixel depth data, rather than depth data for all pixels. In some embodiments, the depth map (i.e. a stereo depth map) is generated based on images generated by the first camera pair, and the stereo depth map is used for performing parallax correction.

The embodiments estimate depth by computing disparity (i.e. the observed displacement) for corresponding pixels between the two simultaneously captured images. Because two observing sources (i.e. cameras) are involved (just like the scenario in which a user uses both eyes to observe displacement), a disparity value can be computed for pixels in an image.

By way of example, suppose a person were to look at his/her finger with both eyes. If that person were to close one eye while looking at the finger and then open that eye while closing the other, that person will be able to observe a displacement in the location of the finger. If the finger is closely positioned to the person's eyes, then the observed displacement is large. If the finger is far from the person's eyes, then the observed displacement is small. The observed displacement is inversely proportional to distance from an observing source (e.g., an eye). Using this disparity between the two offset cameras, the embodiments are able to calculate a corresponding depth for each captured pixel. As a result, a three-dimensional model (i.e. a depth map) is generated to map the three-dimensional coordinates for each pixel (or a subset of pixels) in a particular image.

Some embodiments downscale the resulting depth map (or any of the camera image(s) 315) to reduce the amount of information included in the depth map (or camera image(s)). Additionally, or alternatively, some embodiments perform filtering operations on the depth map to reduce noise or perhaps to smooth out the depth map.

Figure 3D:
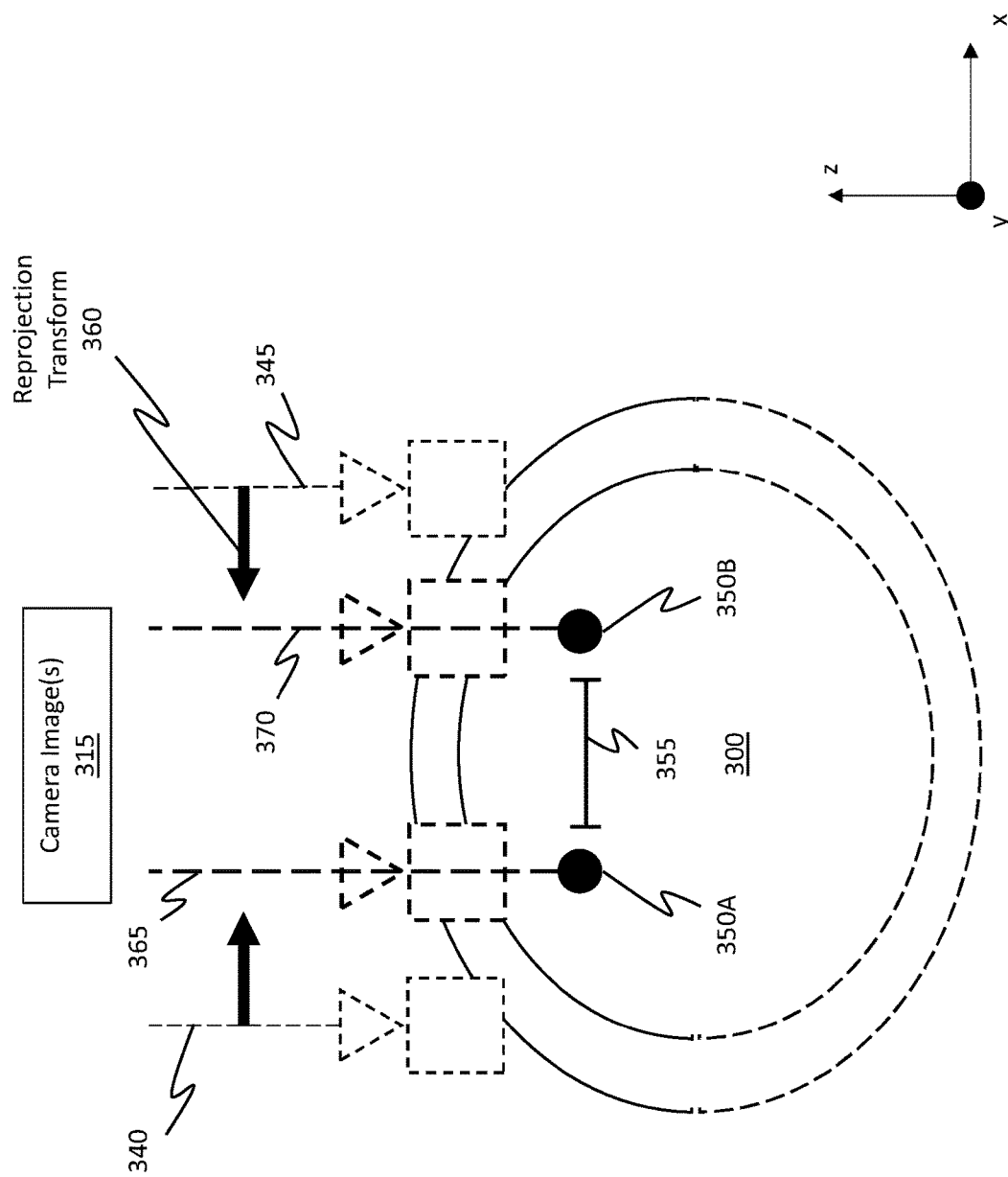

After generating the depth map, the camera image(s) 315, which were previously corrected and transformed, are "reprojected" so that a center-line perspective of one image (i.e. the optical axis embodied within that image) aligns with one of the user's pupil and a center-line perspective of the other image (i.e. the optical axis embodied within that image) aligns with the user's other pupil. This reprojection operation is illustrated in FIG. 3D. The reprojection relies on the depth map that was previously generated. That is, the reprojection relies on the computed depth to alter or modify the geometry of the image in a three-dimensional manner.

In particular, FIG. 3D shows the same optical axes 340 and 345 from FIG. 3C. Also shown is a representation of a user's left pupil 350A and the user's right pupil 350B, as well as the distance between those two pupils (i.e. the interpupil distance IPD 355). Measuring the IPD 355 may be performed by any type of eye tracking technique, including use of eye tracking cameras, measurement of eye glint, and so forth.

FIG. 3D shows a reprojection transform 360 that programmatically re-aligns or re-projects the perspectives embodied within the camera image(s) 315 to correspond to the perspective of the user's pupils 350A and 350B (i.e. optical axis 340 is transformed to a new location as shown by transformed optical axis 365, and optical axis 345 is transformed to a new location as shown by transformed optical axis 370). Often, the physical distance between the cameras 305 and 310 is greater than the physical distance between the user's pupils 350A and 350B. For instance, the baseline of the cameras 305 and 310 (i.e. the distance between the cameras) is often at least 7 centimeters (cm). In contrast, typical distances between human pupils is between about 54 millimeters (mm) and about 74 mm. As such, the reprojection often causes the perspectives of the images to move inward.

Because the baseline of the two cameras (i.e. the distance between the two cameras) is much larger than the baseline of a human's eyes (i.e. the interpupil distance), the resulting images (camera image(s) 315) will still look distorted to the user if only an epipolar transform were performed. To correct for these distortions, the embodiments digitally (i.e. via software processes) "reproject" the camera image(s) 315 so that the perspective embodied by those images reflects a perspective that matches or corresponds with the perspective of the user's pupils. For instance, a position of the transformed optical axis 365 is selected to be in front of the pupil 350A while a position of the transformed optical axis 370 is selected to be in front of the pupil 350B.

In essence, the reprojection transform 360 essentially digitally alters a digital image so that the digital image appears as though the digital image were captured by a camera that was placed in a different position (where the position is essentially immediately in front of one of the user's pupils). It will be appreciated that the cameras 305 and 310 are not actually being moved; instead, new digital images are being created in such a manner that the digital images appear as though they were captured by a camera situated at a new position (i.e. in front of the user's pupil). Reprojection is generally known in the art and will not be discussed in detail. Notably, however, the embodiments reproject the perspectives embodied within the images to correspond to a perspective of the user's pupils.

Figure 3E:
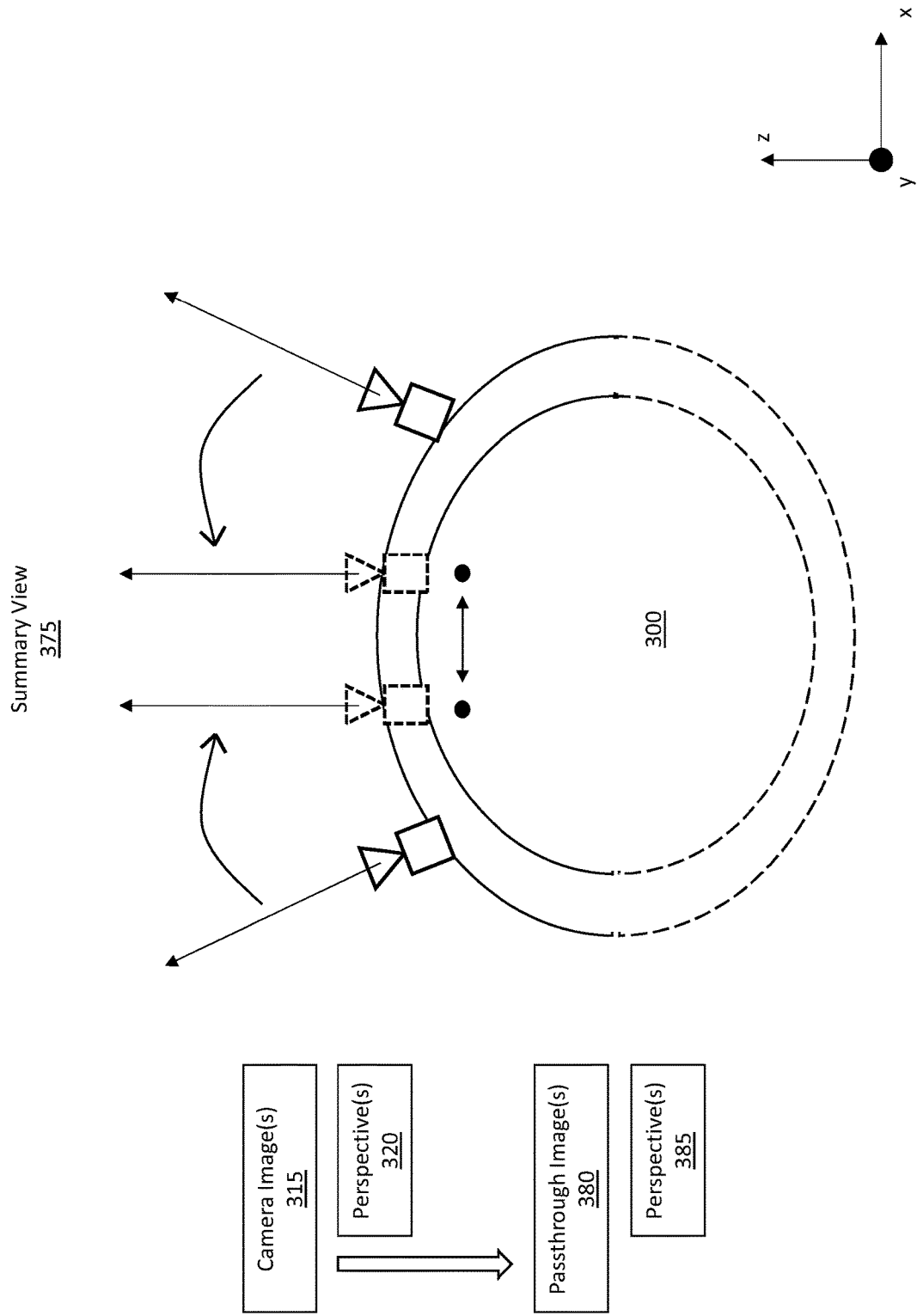

FIG. 3E shows a summary view 375 of the different programmatic transforms that are applied in order to transform (e.g. using the different corrections and/or transforms discussed in FIGS. 3B through 3D) the perspective(s) 320 of the original camera image(s) 315. Such transforms cause passthrough image(s) 380 to be generated, where the perspective(s) 385 of the passthrough image(s) 380 correspond to perspectives of the user's pupils if the user were not wearing the HMD 300.

Figure 3F:
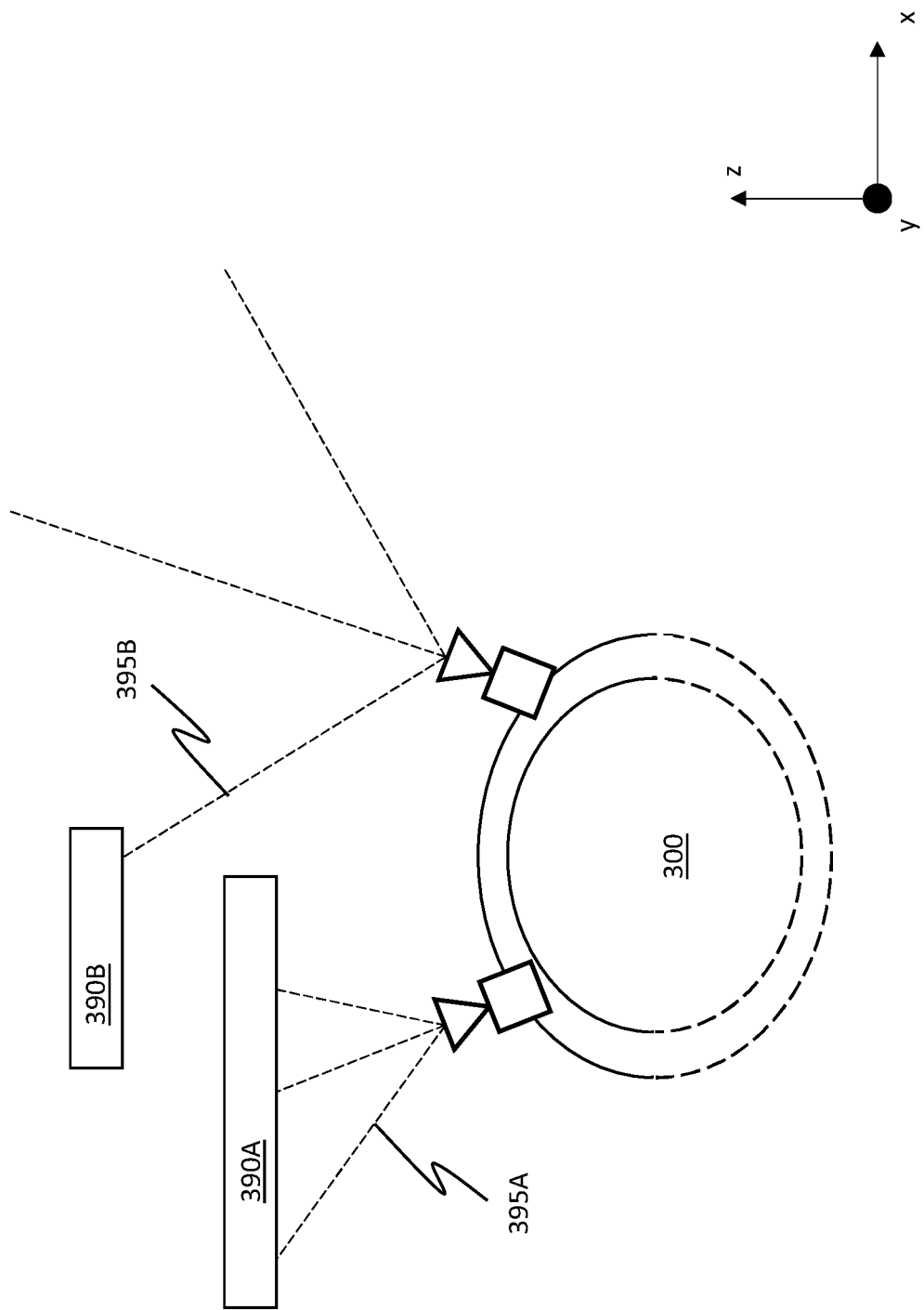

FIG. 3F illustrates an example scenario that may occur in some situations. In particular, FIG. 3F shows an object 390A that is physically located in front of another object 390B in the z-axis direction. The field of view (FOV) 395A of one camera captures object 390A, but it does not capture object 390B. Instead, the FOV 395B of the other camera captures object 390B. To clarify, in this scenario, object 390A is partially blocking the FOV 395A from being able to observe the object 390B.

When scenarios such as this one occurs, only one camera is able to capture images of an obscured, or rather hidden, object (e.g., object 390B). As a result, the depth of the hidden object cannot be calculated in the same manner as described above. To compensate for this scenario, the embodiments estimate the depth.

This estimation can occur in a number of ways. For instance, in some embodiments, the front object (i.e. object 390A) will have its depth coordinates calculated using the principles described above (because both cameras can potentially view that object). Then, these embodiments assign "estimated" depth coordinate values to the hidden object. These estimations are generated using the front object's depth coordinates as an initial baseline and then increasing those depth coordinate values a selected amount to thereby cause the hidden value to be at least partially farther back (i.e. deeper) than the front object. The selected value may be any value sufficient to cause the hidden object to appear farther back than the front object.

Other embodiments compensate for this scenario by emphasizing the hidden object in some manner so as to call the user's attention to that object. By calling the user's attention to the object, the user will change his/her orientation so as to allow both cameras to capture images of the hidden object (which results in proper depth calculations being performed). In some instances, the emphasizing may include generating a halo effect around the hidden object. In other instances, the emphasizing may include highlighting the hidden object. Regardless of what type of emphasizing is used, the purpose of the emphasizing is to cause the user to change his/her position so both cameras can detect the object.

Depth Maps & Passthrough Images

As an initial matter, it is noted that MR systems are often used in many different environments. Some environments are brightly lit, some are dimly lit, and some have combinations of brightly lit areas and dimly lit areas.

For reference, a bright sunny day typically has an ambient light intensity of around 10,000-50,000 lux. An overcast day typically has an ambient light intensity of around 1,000-10,000 lux. An indoor office typically has an ambient light intensity of around 100-300 lux. The time of day corresponding to twilight typically has an ambient light intensity of around 10 lux. Deep twilight has an ambient light intensity of around 1 lux. As used herein, a "dim" or "low" light environment or area at least corresponds to any environment or area in which the ambient light intensity is at or below about 40 lux. A "bright" light environment or area at least corresponds to any environment or area in which the ambient light intensity is at or above about 5,000 lux. A "dark" environment at least corresponds to any environment or area in which the light intensity is below about 1 lux. Unless specified as being a "low" light or a "dark" environment, reference to a "lighted" environment corresponds to any environment or area that is above about 40 lux.

Figure 4A:
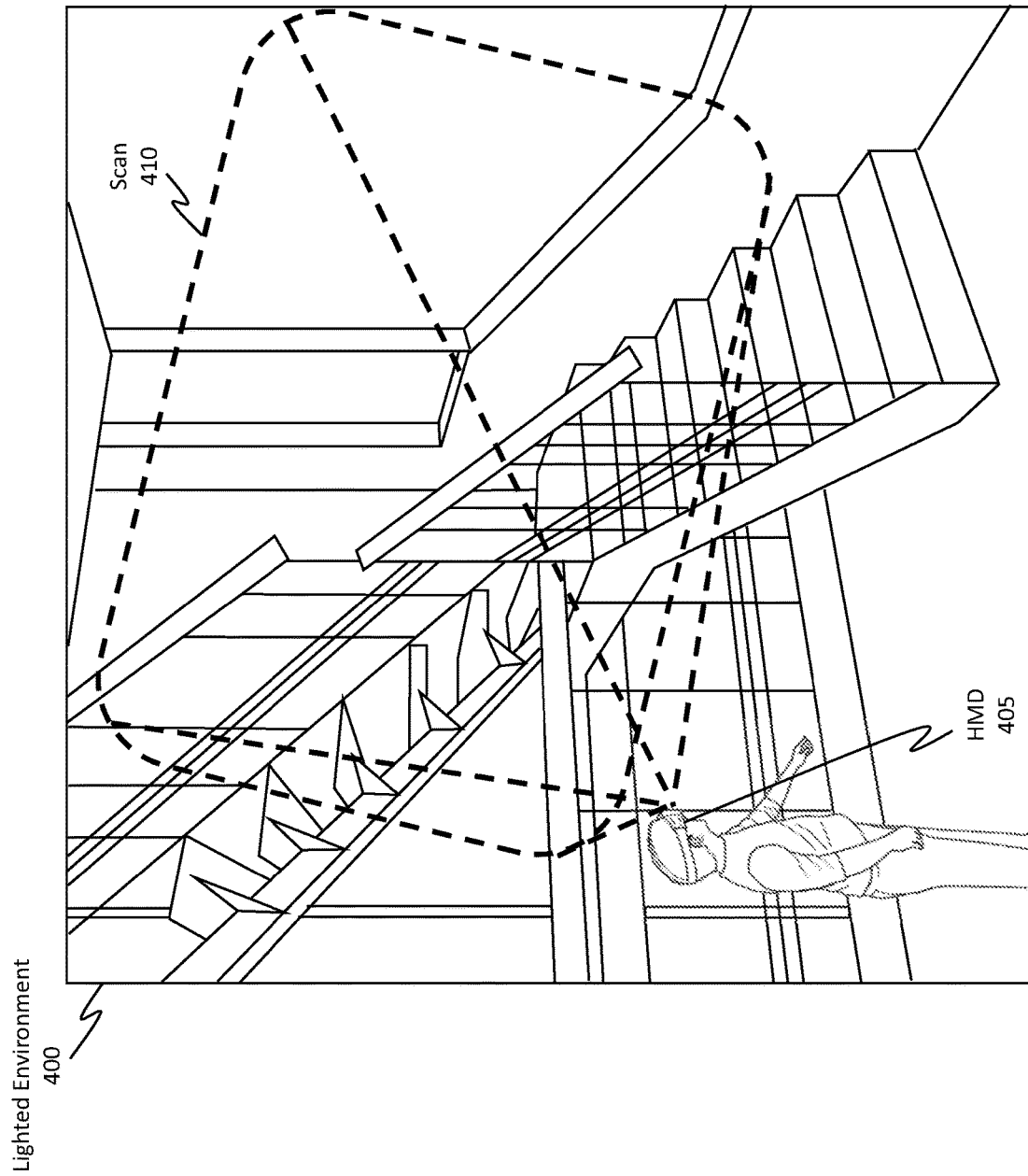
FIG. 4A illustrates an example of a lighted environment and how the HMD may be used in that lighted environment.

FIG. 4A shows an example of a lighted environment 400 and a user wearing an HMD 405, which is representative of the HMDs discussed thus far. As shown, the HMD 405 is scanning (e.g., scan 410) the lighted environment 400 to enable the user to navigate and to avoid obstacles (e.g., the stairs).

Figure 4B:
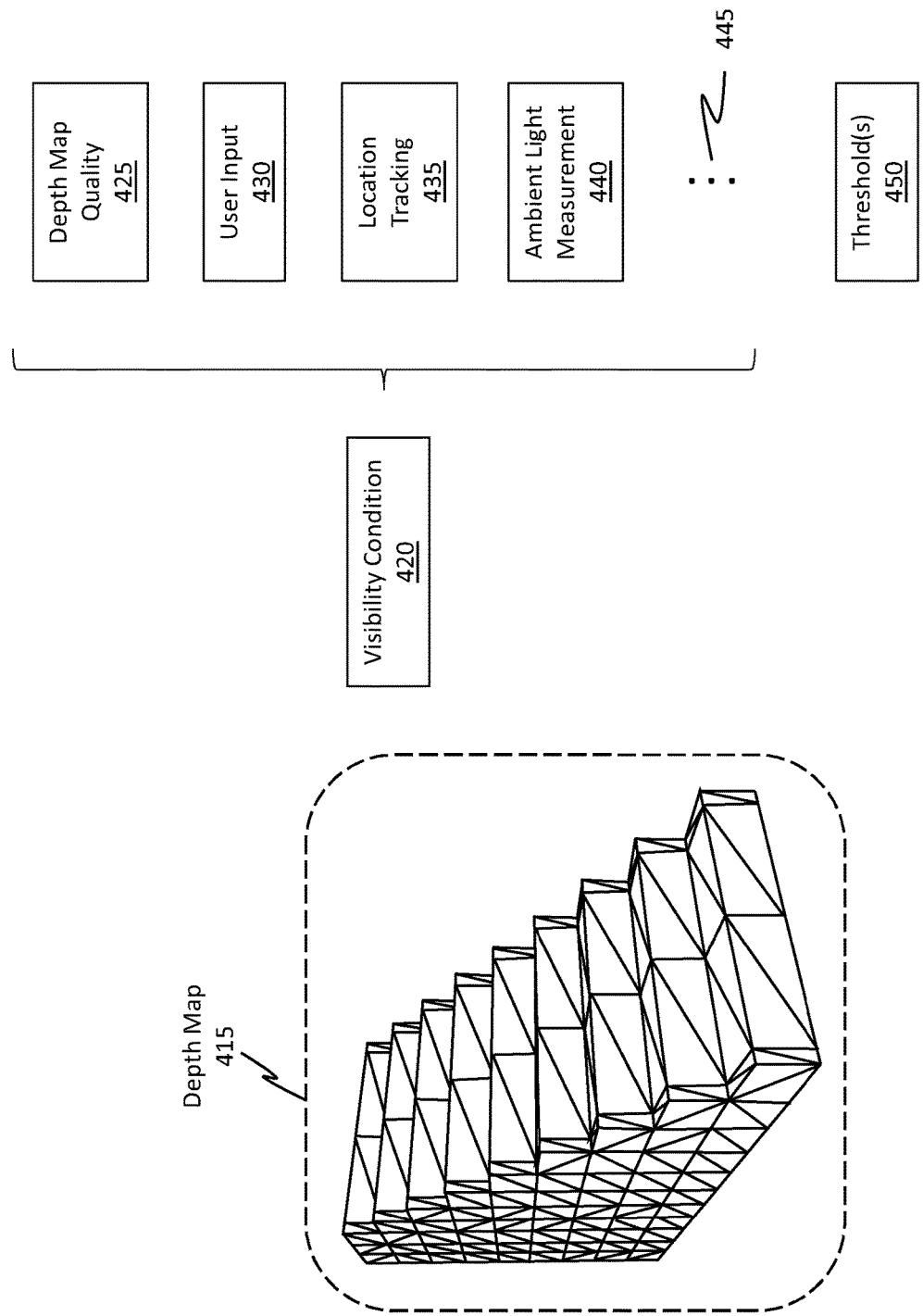
FIG. 4B illustrates an example of a depth map and how the visibility conditions of an environment may impact the generation of the depth map.

As a result of the scan 410, the HMD 405 is able to generate a depth map, such as the depth map 415 shown in FIG. 4B. Generally, the depth map 415 is an example of a three-dimensional (3D) representation of the lighted environment 400. This 3D representation can be generated based on scanning data that is generated from the scan 410. One will appreciate that the 3D representation can be generated (or at least its generation can be started) while the HMD 405 is currently scanning an environment. Additionally, or alternatively, the 3D representation can be generated after the environment is scanned. In some cases, the scanning data is stored locally on the HMD 405 while in other cases the scanning data can be stored in a remote repository (e.g., a cloud storage system). If stored in the cloud, then a cloud service can be used to generate the 3D representation based on the scanning data.

As shown in FIG. 4B, in some embodiments, the depth map 415 may be comprised of any number of polygons (e.g., 3D triangles). These polygons are shaped and oriented in different configurations to symbolically, or rather digitally, represent an object. FIG. 4B, for example, shows how the different polygons are shaped and oriented in a manner to digitally reflect or represent a staircase, such as the staircase shown in FIG. 4A. Each stair in the staircase is digitally represented by a number of different polygons. In other embodiments, the depth map 415 includes depth values to digitally represent the features of the lighted environment 400. The depth map 415 may be used when performing the different corrections and transforms that were discussed earlier.

As a part of the scan 410, the HMD 405 is also able to determine the current visibility condition 420 (FIG. 4B) of the lighted environment 400. As used herein, the visibility condition 420 generally refers to the ability of the HMD 405 to locate itself within an environment (e.g., the lighted environment 400). For example, if the environment is well lit and free of smoke, mist, fog, or other visibility impairing matter, then the visibility condition 420 will indicate that the HMD 405 should be able to readily determine its location within the environment. On the other hand, if the environment is not well lit or if the environment has smoke, mist, fog, or some other visibility impairing matter, then the visibility condition 420 will reflect or indicate that the HMD 405 is probably not able to readily determine its location within the environment.

Determining the visibility condition 420 may be performed in a number of ways. As a first example, this determination process may be based on analyzing the depth map quality 425 of the depth map 415. For instance, if the depth map 415 includes a high amount of noise (or rather, a threshold amount of noise), the depth map quality 425 will be relatively lower than if the depth map 415 had less noise.

Similarly, if the depth map 415 includes inaccuracies, skewed data, ghosted data, patches that were not scanned or that were not scanned sufficiently long, or patches that indicate unclear or false depth data, then the depth map quality 425 will also be lower. If the depth map quality 425 is below a particular threshold (e.g., included among threshold(s) 450), then the visibility condition 420 may include data that indicates the HMD 405 is probably not able to locate and/or orient itself in the environment. The threshold(s) 450 is provided to represent any number or type of thresholds, without limit. In this regard, determining the current visibility condition 420 may be performed by determining a quality of a depth map that is generated based on images obtained using a first camera in combination with another camera of a same type as the first camera (e.g., a pair of visible light cameras or a pair of low light cameras).

The visibility condition 420 may also be determined based on user input 430 that is received at the HMD. For instance, if the depth map quality 425 is below the threshold, the HMD 405 may issue an alert to the user to inquire about the environment's current conditions. The user can respond with the user input 430 informing the HMD 405 of the poor-quality visibility conditions.

Additionally, or alternatively, the user can provide the user input 430 independently and without an alert being issued. In this case, the user can inform the HMD 405 that the environment has poor visibility conditions (or rather, visibility conditions that fail to satisfy a visibility threshold). In some cases, the user input includes activating or deactivating the low light cameras or the thermal imaging camera (e.g., perhaps the user input involves the user activating any of the switches mentioned in FIG. 2A). Activating or deactivating these switches can operate to inform the HMD that the visibility conditions 420 (e.g., the visible light visibility conditions) are below a particular threshold.

The visibility condition 420 may be determined based on the ability of the HMD 405 to locate itself within the environment, as shown by location tracking 435. For reference, an "inside-out" tracking system (e.g., location tracking, head tracking, hand tracking, etc.) tracks the position of an HMD (e.g., HMD 405) by monitoring the HMD's position relative to its surrounding environment. This feat is accomplished through the use of tracking cameras (e.g., the disclosed cameras mentioned herein) that are mounted on the HMD and that are pointed away from the HMD. By detecting features in the environment, the HMD is able to determine its position relative to the environment. In contrast, an "outside-in" tracking system uses cameras that are mounted in the environment and that are pointed toward the HMD.

If the HMD 405 is unable to identify a sufficient number of features or anchor points in the environment (e.g., perhaps because of poor light conditions or perhaps because other visibility impairing content is obstructing the HMD's ability), then the HMD 405 may be unable to perform location tracking 435. If the location tracking 435 fails to satisfy a location tracking threshold (e.g., which may be included in the threshold(s) 450) or if a threshold number of anchor or reference points are not detectable, then the visibility condition 420 may indicate that the visibility conditions of the environment are below a threshold visibility level. Accordingly, in some embodiments, determining the current visibility condition 420 is performed by determining whether the computer system/HMD is able to locate itself within the environment using its cameras (e.g., its visible light cameras or its low light cameras).

The visibility condition 420 may also be determined based on an ambient light measurement 440 of the environment. The HMD 405 is able to use any of its cameras to determine the current light conditions of the environment (i.e. to determine the illuminance levels of the environment). The detected illuminance may be included in the ambient light measurement 440. If the ambient light measurement 440 is below a light threshold (e.g., included within the threshold(s) 450), then the visibility condition 420 may indicate that the environment's visibility is below a particular threshold. The ellipsis 445 illustrates how the visibility condition 420 may be based on other factors as well, without limit. By way of example, the visibility condition 420 may indicate that a detected texture of the environment is below a texture threshold, which may be included in the threshold(s) 450.

Figure 4C:
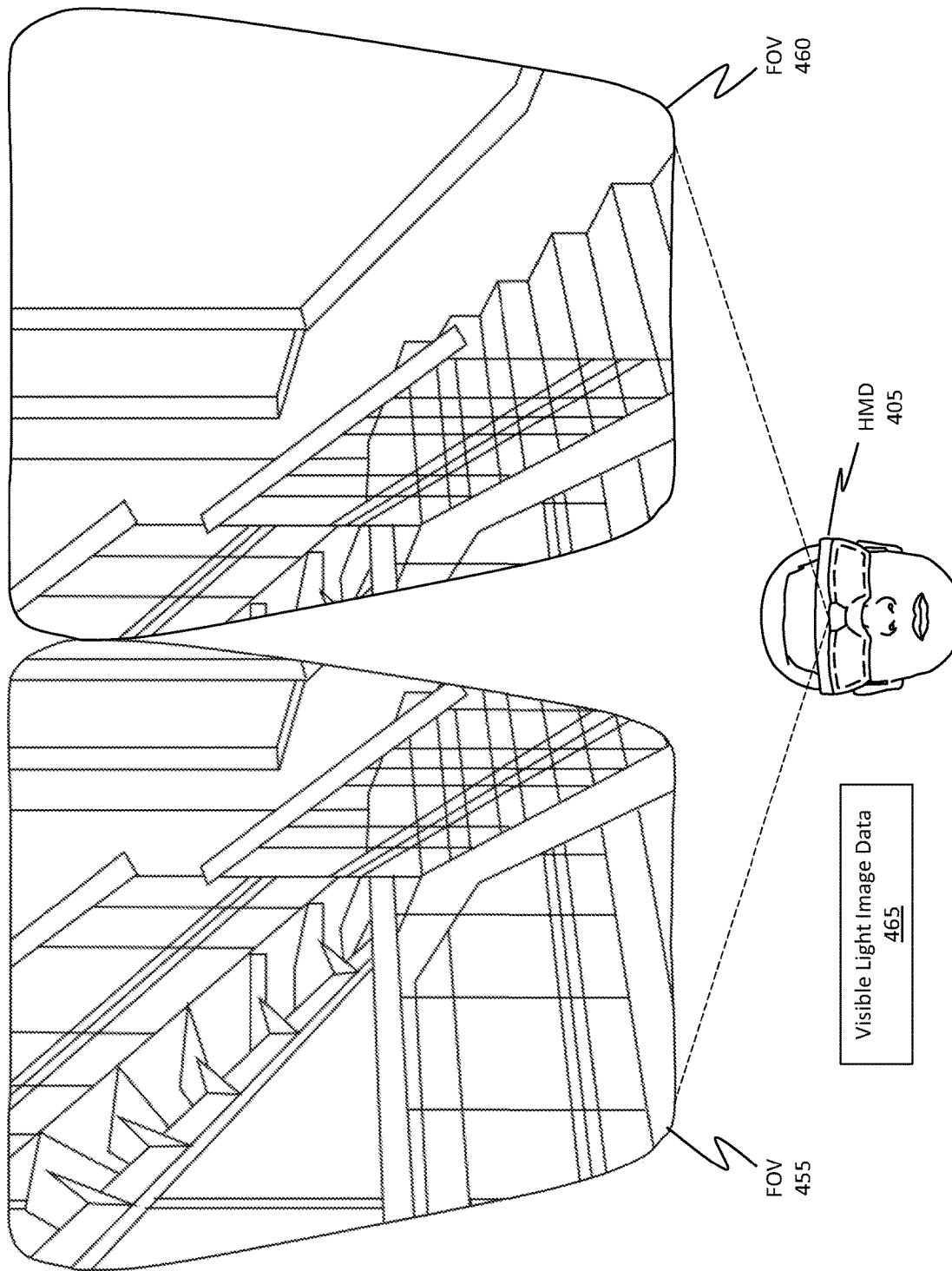
FIG. 4C illustrates an example of passthrough visualizations that may be displayed on an HMD, with one passthrough visualization/image being displayed in a right-hand field of view (FOV) of the HMD, and another passthrough visualization/image being displayed in a left-hand FOV of the HMD.

When the visibility condition 420 of the environment indicates that the visible light cameras of the HMD 405 should be able to adequately locate and track the HMD 405 within the environment, then the visible light cameras may be used to generate passthrough images in the manner discussed earlier. FIG. 4C is representative of such a scenario.

FIG. 4C shows how the HMD 405 is able to display a corresponding passthrough image for each one of the user's eyes to view, as shown by the FOV 455 (which displays a passthrough image for one of the user's pupils) and the FOV 460 (which displays a passthrough image for the other one of the user's pupils). In this context, because the environment is a lighted environment 400 and because the visibility condition 420 indicated that the HMD 405's visible light cameras should be able to track the location of the HMD 405, the HMD 405 (e.g., using its visible light cameras) generated visible light image data 465 and generated visible light passthrough images for the user to view. As shown, the passthrough images displayed in the FOV 455 and 460 reflect or are representative of the stairway that was shown in FIG. 4A. The stairway is shown because the user was originally facing the stairway. As the user moves, the passthrough visualizations will be updated in response to those movements.

Figure 5A:
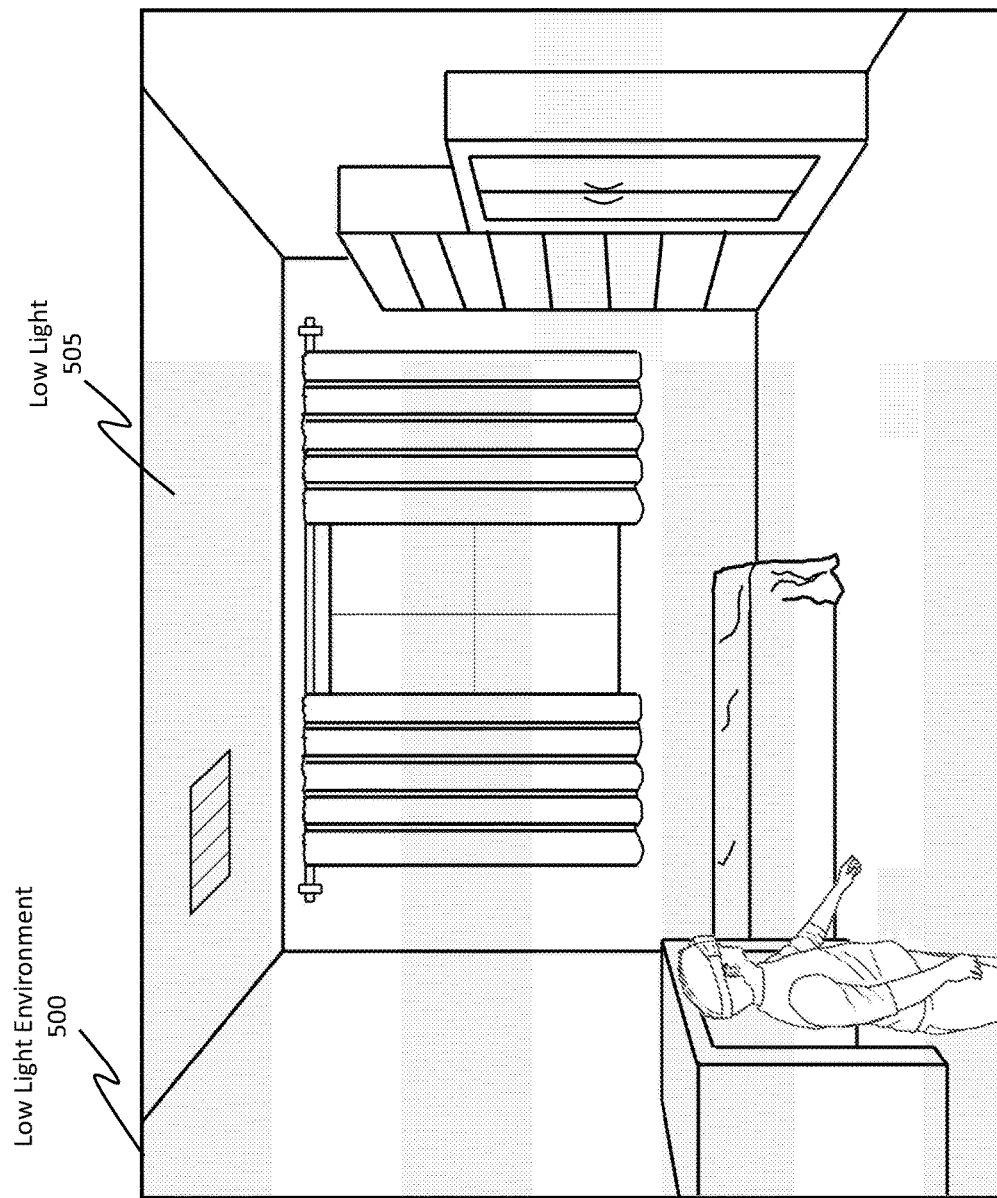
FIG. 5A illustrates an example of a low light environment.

In contrast to the lighted environment 400 of FIG. 4A, FIG. 5A shows a user immersed in a low light environment 500. The dotted pattern in the illustration represents the low light 505. In this case, the visibility condition (e.g., visibility condition 420 from FIG. 4B) will indicate that the visible light cameras may not be able to adequately track the HMD in the low light environment 500. In response to this particular visibility condition, the embodiments are able to trigger the use of the HMD's low light cameras, such as the low light cameras 210A and 210B in FIG. 2A. These cameras may then be used to track the HMD's position within the low light environment 500 and may also be used to provide a low light passthrough image (i.e. night vision passthrough images) for the user to view, as shown in FIG. 5B.

Figure 5B:
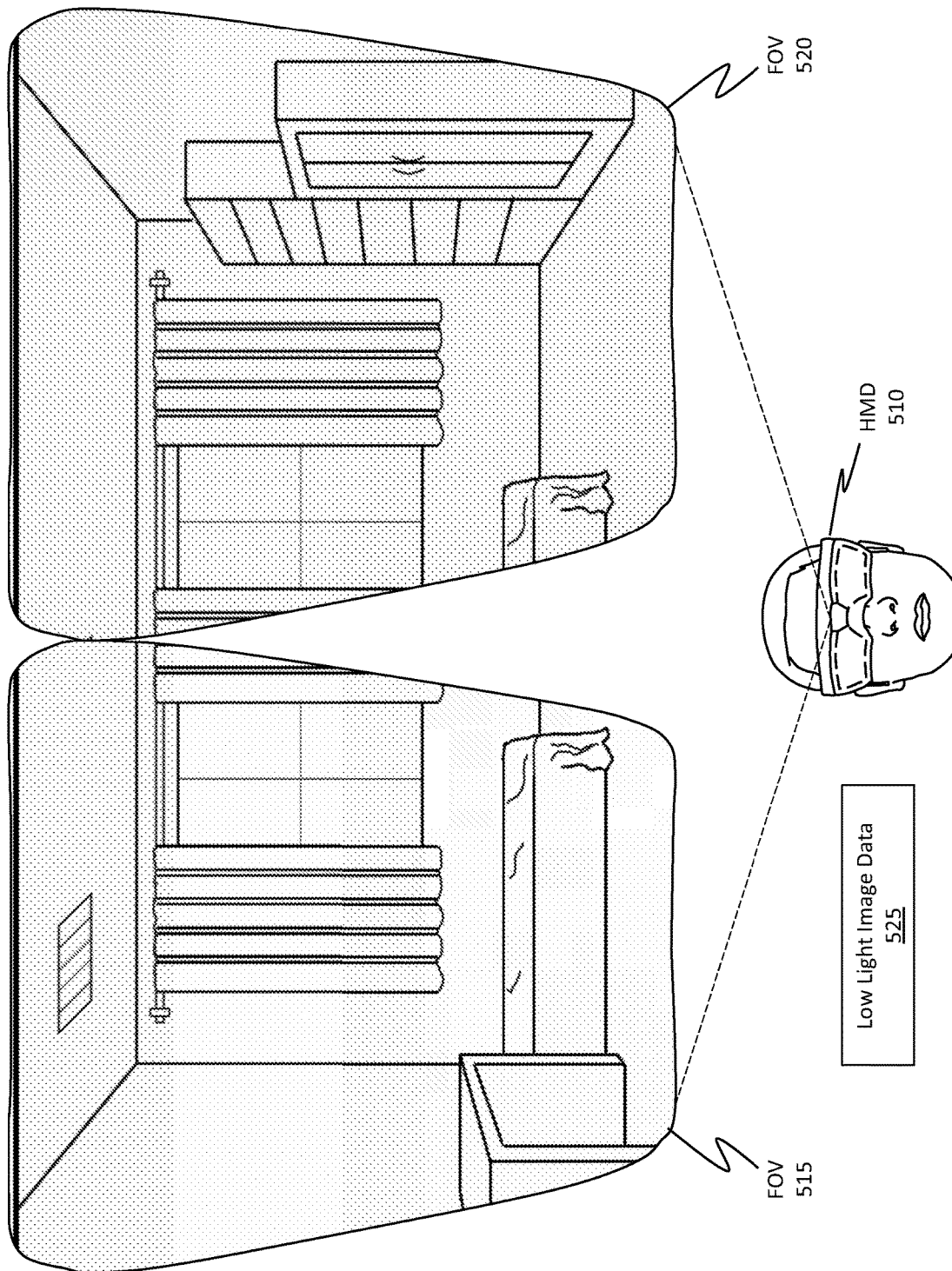
FIG. 5B illustrates how low light passthrough images, which are comprised of visible light data and infrared (IR) light data, may be generated and displayed on an HMD.

In particular, FIG. 5B shows an HMD 510, which is representative of the HMDs discussed thus far, as well as the FOV 515 and FOV 520 of the HMD 510. In this scenario, because the HMD 510 is operating in the low light environment 500, the HMD 510 triggered use of its low light cameras based on the information indicated in the visibility conditions. Here, the low light cameras generated low light image data 525, and the HMD 510 used this low light image data 525 to generate low light passthrough images, which are displayed in the FOV 515 and FOV 520.

For instance, the FOV 515 and FOV 520 are displaying portions of the bedroom furniture included in the low light environment 500. Even though the environment is a low light environment, the furniture is still readily identifiable and displayable by the HMD 510.

In some cases, the HMD 510 automatically activates (e.g., based on the light conditions) use of its low light cameras in order to generate the low light passthrough images, while in other cases the low light cameras are activated only in response to user input (e.g., by activating or deactivating the switches 220A and/or 220B in FIG. 2A, or perhaps a single switch that controls both cameras). In this regard, the HMD 510 is able to operate in a night-vision mode by displaying night vision images (i.e. the low light images).

Figure 6A:
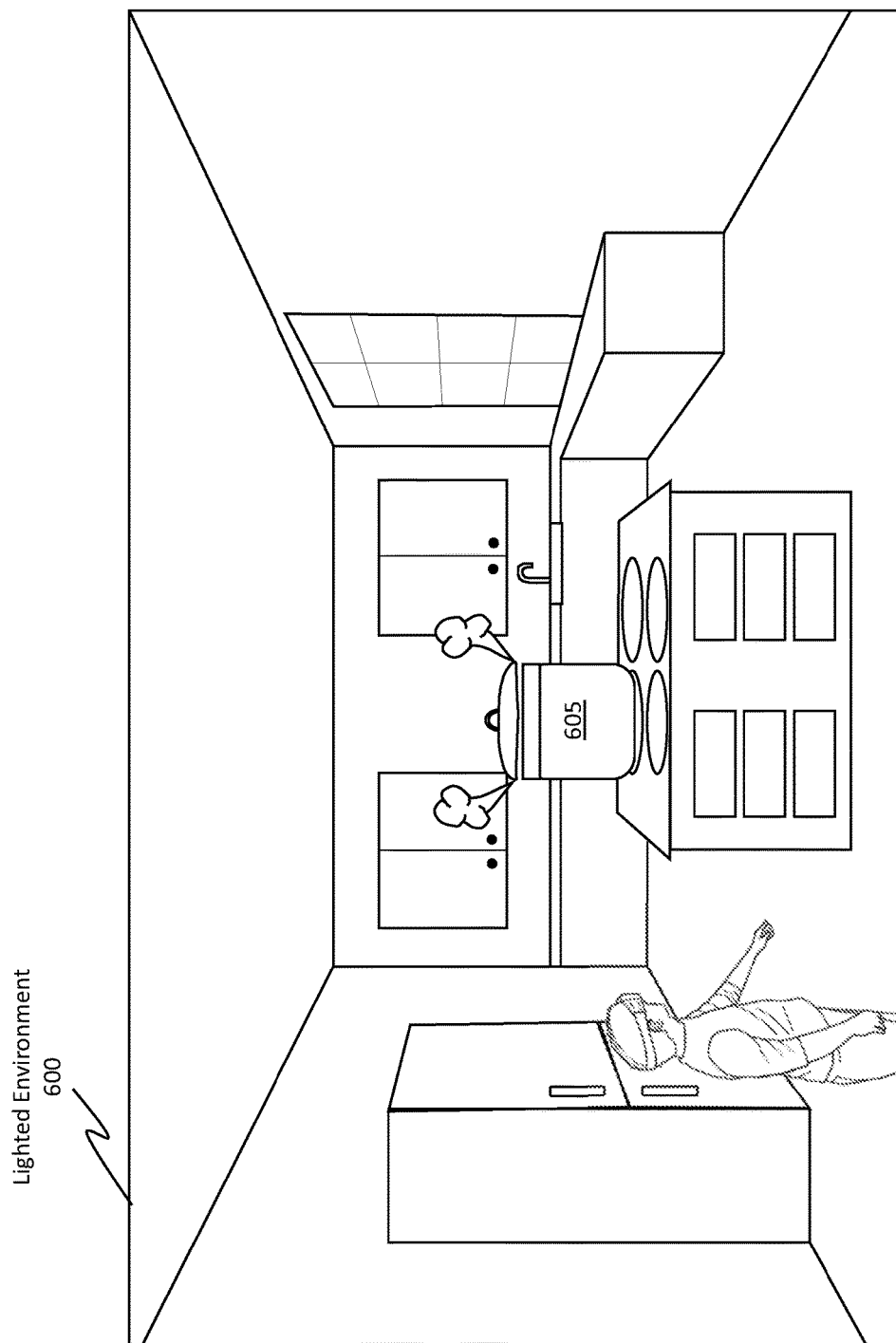
FIGS. 6A, 6B, and 6C illustrate how thermal data, or rather long wave electromagnetic radiation data, may be displayed in passthrough images.

FIG. 6A shows another example of a lighted environment 600. This particular environment includes a hot and steaming pot 605. Because the lighted environment 600 is sufficiently lit (i.e. has a threshold degree of illuminance to enable the visible light cameras to accurately determine depth, position, and so forth), the HMD's visible light cameras may be used to generate visible light passthrough images, as was described in FIG. 4C.

Figure 6B:
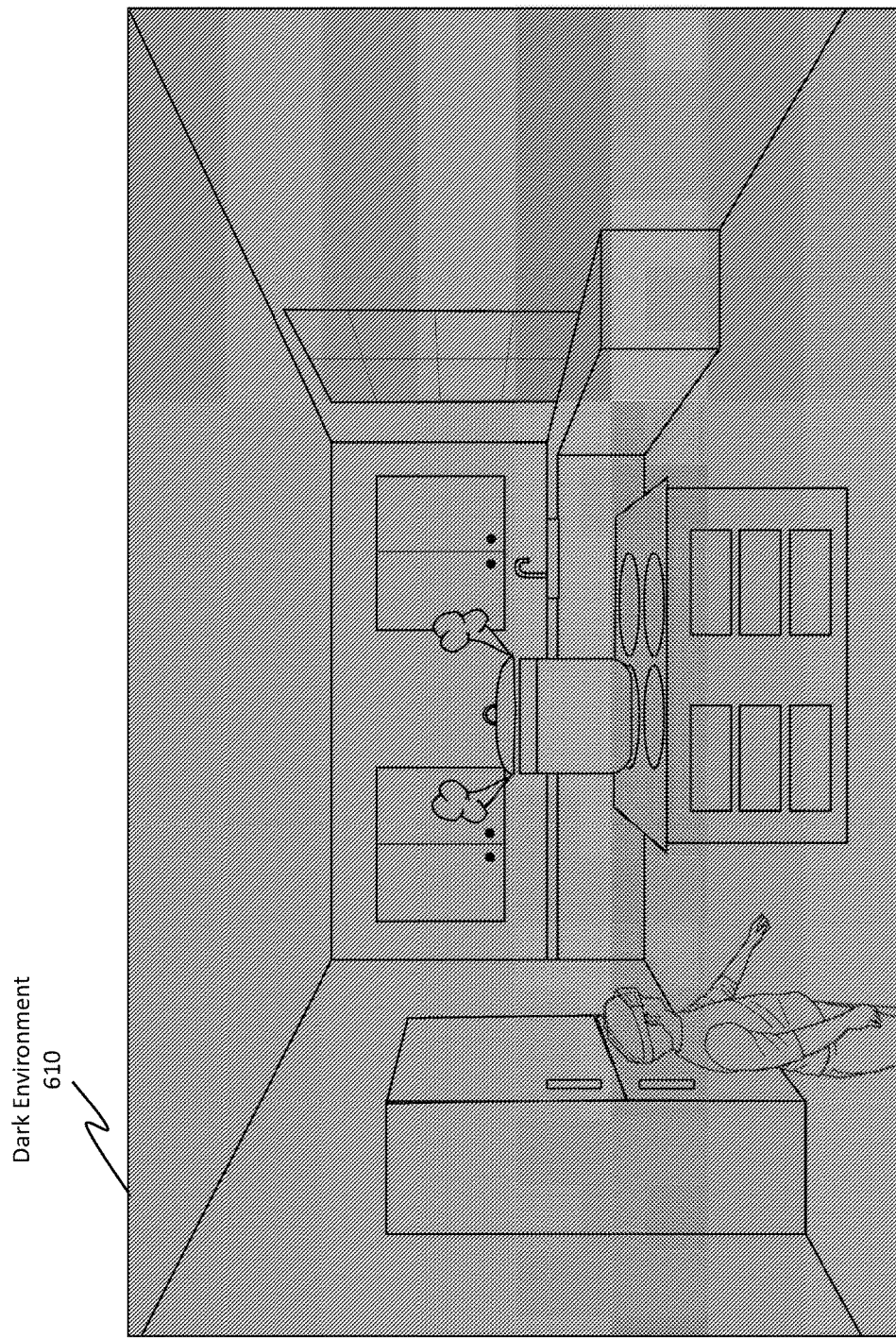
Figure 6C:
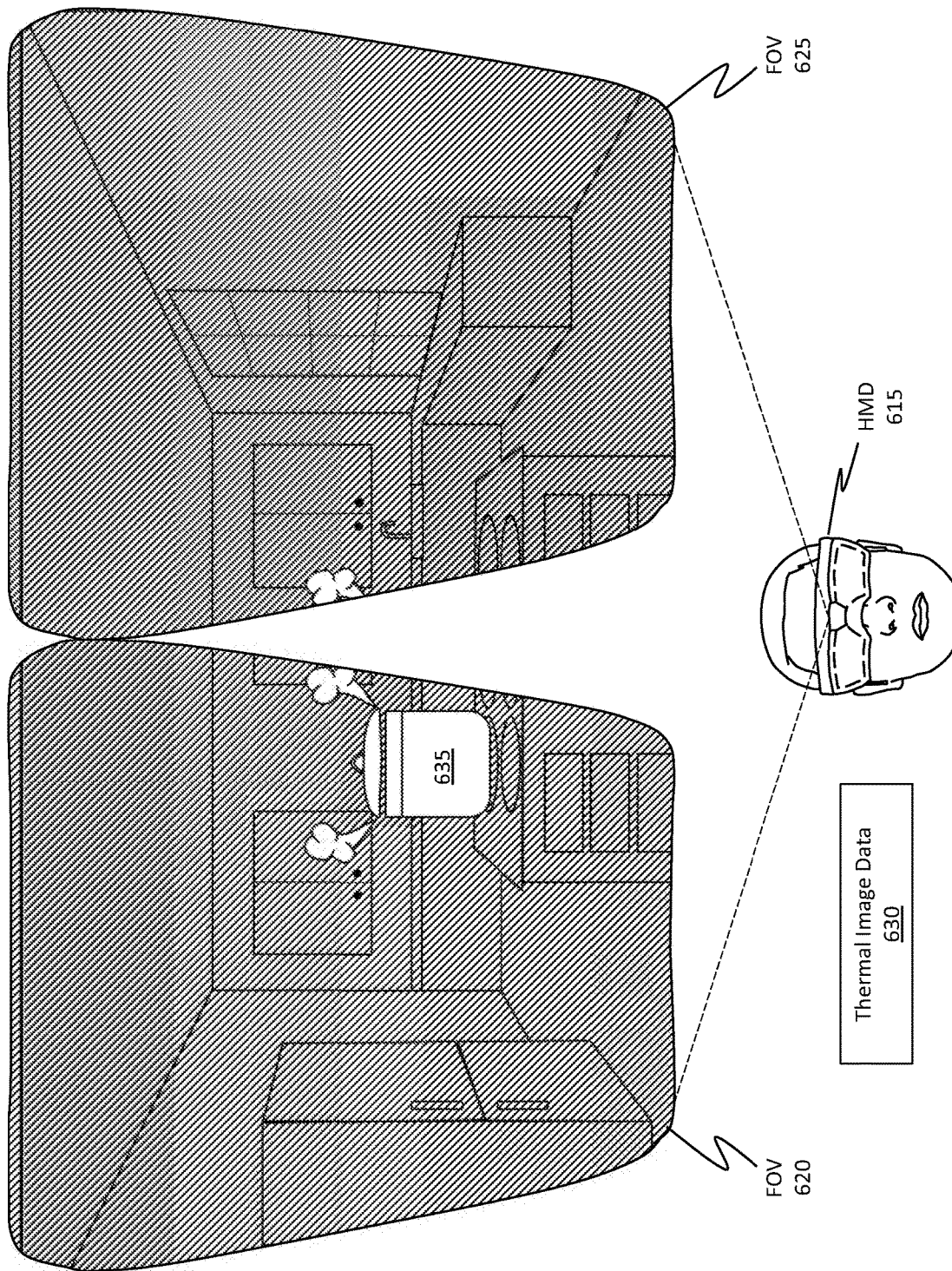

FIG. 6B, on the other hand, shows the same environmental features (i.e. the kitchen), but now the environment is a dark environment 610. It may be the case (though not necessarily) that in FIG. 6B, neither the visible light cameras nor the low light cameras are able to detect a sufficient amount of light to generate passthrough images for the user. In this case, therefore, the HMD may rely only on its thermal imaging camera (e.g., thermal imaging camera 215 in FIG. 2A). FIG. 6C shows an example use of the thermal imaging camera to provide thermal passthrough images.

Specifically, FIG. 6C shows an HMD 615, which is representative of the HMDs discussed thus far, as well as a FOV 620 and a FOV 625 displaying passthrough images for the user to view. In this case, the HMD 615 triggered the use of its thermal imaging camera based on the data included within the visibility conditions. In particular, the visibility conditions indicated that the amount of light in the dark environment 610 may be below a particular visible light threshold such that the visible light cameras will be unable to detect the HMD 615's position. Additionally, the visibility conditions may have indicated that the amount of light in the dark environment 610 may be below a low light threshold, which is lower than the visible light threshold, such that the low light cameras will be unable to detect the HMD 615's position. It is often the case, however, that the HMD 615 is in an environment where the low light cameras are still able to determine the HMD's 615 position. As such, the scenario in which neither one of the visible light cameras nor the low light cameras can be used to track the HMD 615's position occurs less frequently than the scenario in which the low light cameras are sufficient for tracking.

The HMD 615's thermal imaging camera generated thermal image data 630 in the manner described earlier. This thermal image data 630 may then be displayed to the user in the FOV 620 and 625. For instance, even though none of the other features in the dark environment 610 may be displayed, thermal image data 635 (representative of the steaming pot 605) may be included in the passthrough images displayed in the FOV 620 and 625.

Now that an understanding of how the different types of passthrough images are generated has been provided, the disclosure will now turn to enhancing passthrough images through the use of overlaid content.

Selectively Displaying Different Types of
Passthrough Images with Overlaid Content The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
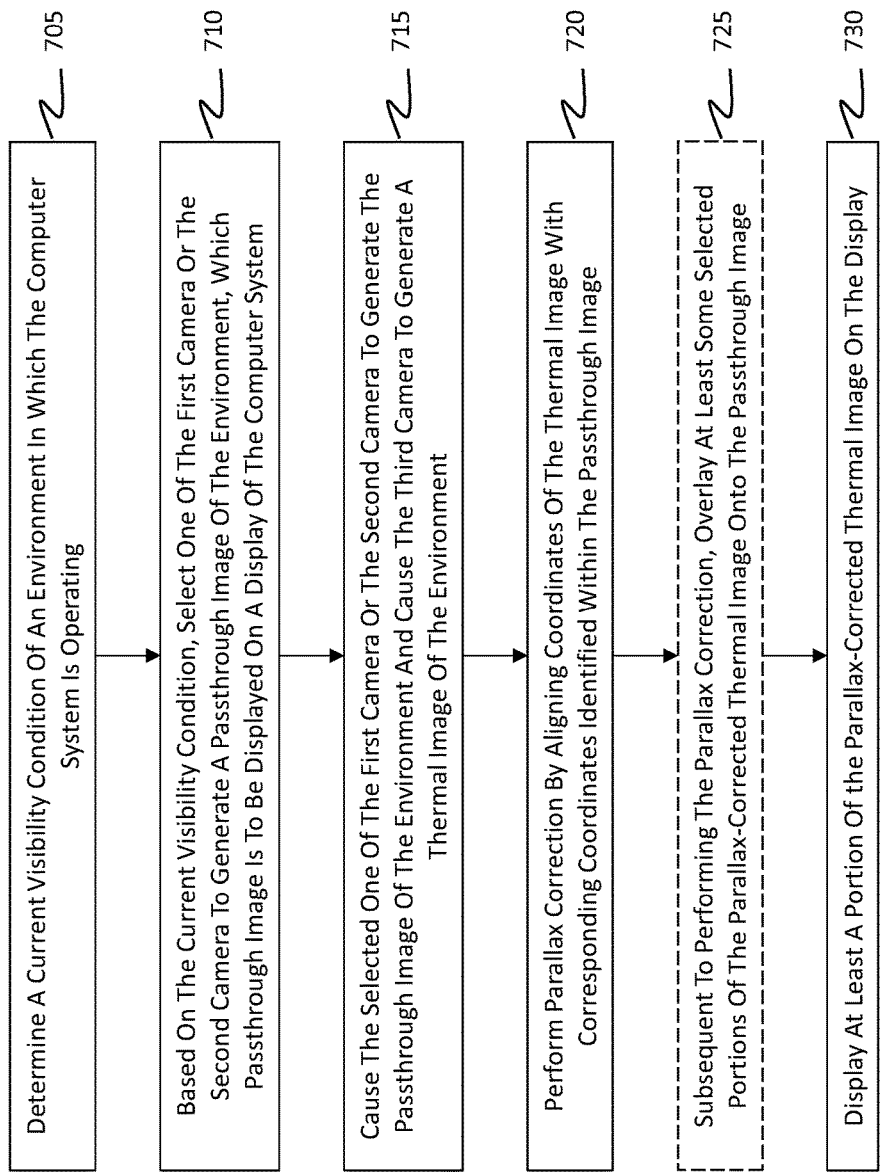
FIG. 7 illustrates a flowchart of an example method for enhancing passthrough images (e.g., both visible light and/ or low light images) to include additional thermal imaging data.

Attention will now be directed to FIG. 7, which illustrates a flowchart of an example method 700 for providing an enhanced passthrough image that includes overlaid content. That is, content generated by one type of camera can be overlaid onto an image generated by another type of camera to provide enhanced information in a passthrough image. Because the images were generated by different cameras placed at different positions on the HMD, it will be beneficial to perform parallax correction to ensure the image data is aligned. In this regard, FIG. 7 focuses on a method for correcting parallax between images captured by multiple different types of cameras included within a computer system (e.g., any of the HMDs discussed thus far, such as HMD 100 of FIG. 1). These images, or at least portions of these images, will be displayed within a resulting or composite passthrough image provided to a user.

As described throughout this disclosure, the computer system may include a first camera structured to detect light spanning a first range of illuminance and a second camera structured to detect light spanning a second range of illuminance. In some cases, the first camera is a visible light camera and is included in a pair of visible light cameras, such as the visible light cameras 205A and 205B in FIG. 2A. In some cases, the second camera is a low light camera and is included in a pair of low light cameras, such as the low light cameras 210A and 210B of FIG. 2A. In some implementations, the first and second cameras are able to detect light in an overlapping range of wavelengths where the wavelengths range between about 400 nm and about 1,000 nm.

The computer system, which performs method 700 of FIG. 7, also includes a third camera structured to detect long wave IR radiation, spanning at least wavelengths between 8 microns and 14 microns. This third camera may be one of the thermal imaging cameras described throughout this disclosure.

Method 700 includes an act (act 705) of determining a current visibility condition of an environment in which the computer system (e.g., an HMD) is operating. This current visibility condition may be any of the conditions described in relation to FIG. 4B. That is, in some cases, the visibility condition is related to an ambient light level and/or perhaps is related to a condition where other visibility impairing content (e.g., smoke, fog, mist, etc.) is present in the environment. For instance, an environment may be brightly lit, but if there is smoke, then the HMD/computer system may not be able to track itself because of the smoke. As such, some embodiments may rely on a combination of ambient light levels as well as whether other visibility impairing content is present. Additionally, any other environmental condition may be detected and may be used to influence the visibility conditions. The embodiments are able to use any type of machine learning to detect the presence of the other visibility impairing content.

As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Based on the current visibility condition, there is an act (act 710) of selecting one of the first camera or the second camera to generate a passthrough image of the environment. In some cases, the first camera is included in a first camera pair, and the second camera is included in a second camera pair. Consequently, the first camera pair or the second camera pair may be selected to generate passthrough images of the environment, with one passthrough image being generated for each one of the user's pupils.

In some embodiments, the first camera pair (e.g., the visible light cameras) is selected when the current visibility condition indicates that an ambient light measurement of the environment satisfies an ambient light threshold (e.g., between about 10 lux and about 100,000 lux), which may be included in the threshold(s) 450 of FIG. 4B. On the other hand, the second camera pair (e.g., the low light cameras) may be selected when the current visibility condition indicates that the ambient light measurement fails to satisfy a signal-to-noise threshold of the first camera pair or is within another ambient light threshold (e.g., between about 1 milli-lux and about 10 lux).

Images generated by the first camera pair may have some noise. If the signal-to-noise ratio exceeds a predetermined signal-to-noise threshold, then the HMD may be prevented or refrained from selecting the first camera pair and may instead use the second camera pair.

Initially, the first or second camera (or camera pairs) generates an image (e.g., camera image(s) 315 of FIG. 3A). This initial image is then subjected to any number of the corrections or transforms that were discussed earlier (e.g., as discussed in FIGS. 3B through 3F). As a result of performing these corrections and transforms, the initial image (or multiple images) is formatted in a manner so it now becomes a passthrough image embodying a perspective corresponding to a perspective of the user's pupil. A different passthrough image may be generated for each of the user's pupils. The passthrough image(s) will be displayed on a display of the computer system.

Returning to FIG. 7, there is an act (act 715) of causing the selected one of the first camera (or first camera pair) or the second camera (or second camera pair) to generate the passthrough image(s) of environment and to cause the third camera to generate a thermal image of the environment. With regard to timing, the first or second camera can generate the initial image. Concurrently or simultaneously with when this initial image is generated, the third camera can generate its thermal image. In other embodiments, there may be a selected delay between when the visible light or low light image is generated and when the thermal image is generated. In any event, the initial image (i.e. the visible light or low light image) is transformed to become the passthrough image in the manner described earlier.

When the second camera (or pair) is not selected based on the current visibility condition, the second camera (or pair) is typically caused to operate in a powered-down state. In contrast, when the first camera (or pair) is not selected based on the current visibility condition, the first camera (or pair) typically continues to operate in a powered-up state.

Although each passthrough image has been transformed and is now formatted for the user's pupils, it may be the case that the thermal image is still misaligned relative to the user's pupils. As such, there is an act (act 720) of performing parallax correction by aligning coordinates of the thermal image with corresponding coordinates identified within the passthrough image(s). As a result of performing this parallax correction, a perspective of the thermal image is aligned with a perspective of the passthrough image.

As indicated in the above paragraph, prior to performing the parallax correction, one or more epipolar transforms are applied to a pair of initial camera images to generate the passthrough images (e.g., one passthrough image for each one of the user's eyes) to ensure the passthrough images are aligned with pupils of a user who is operating the computer system. By performing the parallax correction on the thermal image, the thermal image will also become aligned with the user's pupils because the thermal image is aligned with the passthrough images.

In some embodiments, the parallax correction is performed by also performing a depth-based reprojection on the thermal image (e.g., similar to the reprojection transform 360 from FIG. 3D in which a depth map is used). Because only a single thermal image is often available, the embodiments may estimate depth to perform this reprojection using the depth map generated during the earlier reprojection process (i.e. the embodiments may impute the previously generated depth map discussed in connection with FIG. 3D onto the thermal image to estimate depth for the thermal image). The reprojection transform may be performed by reprojecting coordinates of the thermal image with corresponding coordinates identified within the passthrough images to align a perspective of the thermal image with a perspective of the user's pupil.

In some embodiments, the parallax correction is performed by identifying feature points in the passthrough image and identifying corresponding feature points in the thermal image. Machine learning may be used to identify the corresponding feature points. Once the feature points are identified in the thermal image, then any number of warping transforms may be applied to the thermal image so as to stretch, shrink, skew, rotate, translate, or scale the thermal image to align the thermal image to the passthrough image.

Accordingly, performing parallax correction may be performed in different ways, including performing a reprojection transform to align a perspective of the thermal image with the user's pupil or, alternatively, warping the thermal image (e.g., without necessarily determining the user's pupil perspective) to align the thermal image with the passthrough image. By performing this warping, the embodiments effectively align the perspective of the thermal image with the perspective of the user's eye (even though the user's eye perspective may not be determined directly for the thermal image) because the thermal image is now aligned with the passthrough image, and the passthrough image is aligned with the user's pupil.

Returning to FIG. 7, subsequent to performing the parallax correction, there is an optional act (act 725) of overlaying the parallax-corrected thermal image (or at least selected portions of the parallax-corrected thermal image) onto the passthrough image to generate a composite passthrough image. That is, in some embodiments (though not all, as indicated by the dashed box in FIG. 7 symbolizing the optional nature of this act), selected portions of the thermal image, such as portions identifying heat signatures of different objects in the environment, are overlaid onto the passthrough image. Further details regarding this feature will be provided later. Then, at least a portion (though potentially all) of the parallax-corrected thermal image is then displayed on the display (act 730). If the composite passthrough image described in act 725 were generated, then the composite passthrough image may be displayed on the display.

Figure 8:
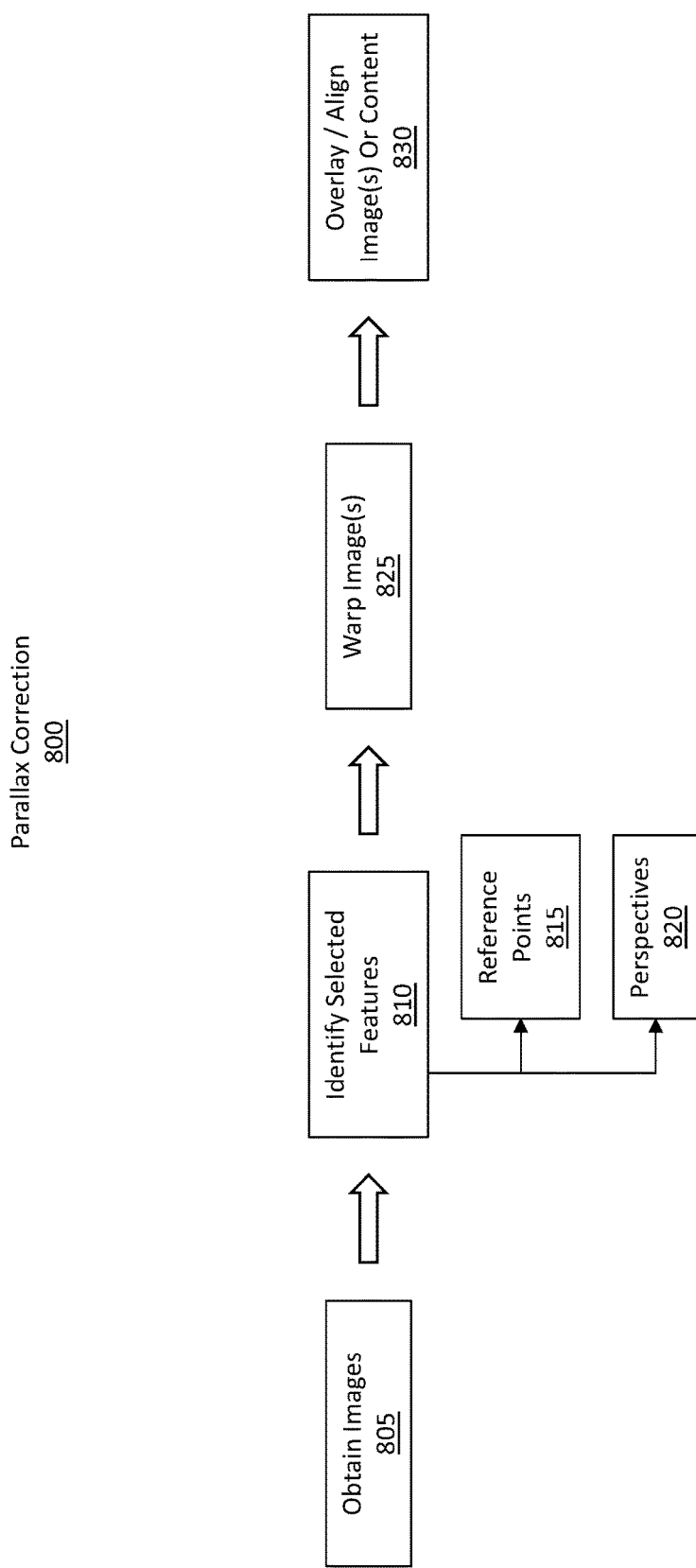
FIG. 8 illustrates a flowchart of an example technique for performing parallax correction to align the thermal image with the passthrough image.

FIG. 8 provides additional detail regarding the warping aspect mentioned in relation to the parallax correction. In particular, FIG. 8 illustrates a flowchart of an example parallax correction 800 technique. Initially, one or more images are obtained from a camera, as shown by act 805. These images may be visible light images, low light images, or thermal images.

Subsequently, the embodiments identified selected features (act 810) from within those images. The selected features may be based on identified reference points 815 or perhaps even an identified perspective 820 or pose. These features are identified because corresponding features are present and identified in another image.

By way of example, suppose a visible light image is obtained and reference features are identified in that image. Further suppose a thermal image is obtained. To perform the parallax correction 800, the embodiments identify corresponding features between the two images. After these features are identified, the embodiments warp one or more of the image(s) (act 825). For instance, if the visible light image has already been formatted to be a passthrough image (i.e. its perspective aligns with the perspective of the user's eye), then the thermal image may be warped to align its common features with the features in the passthrough image. In doing so, the thermal image will also now become at least partially aligned with the user's pupils.

Figure 9:
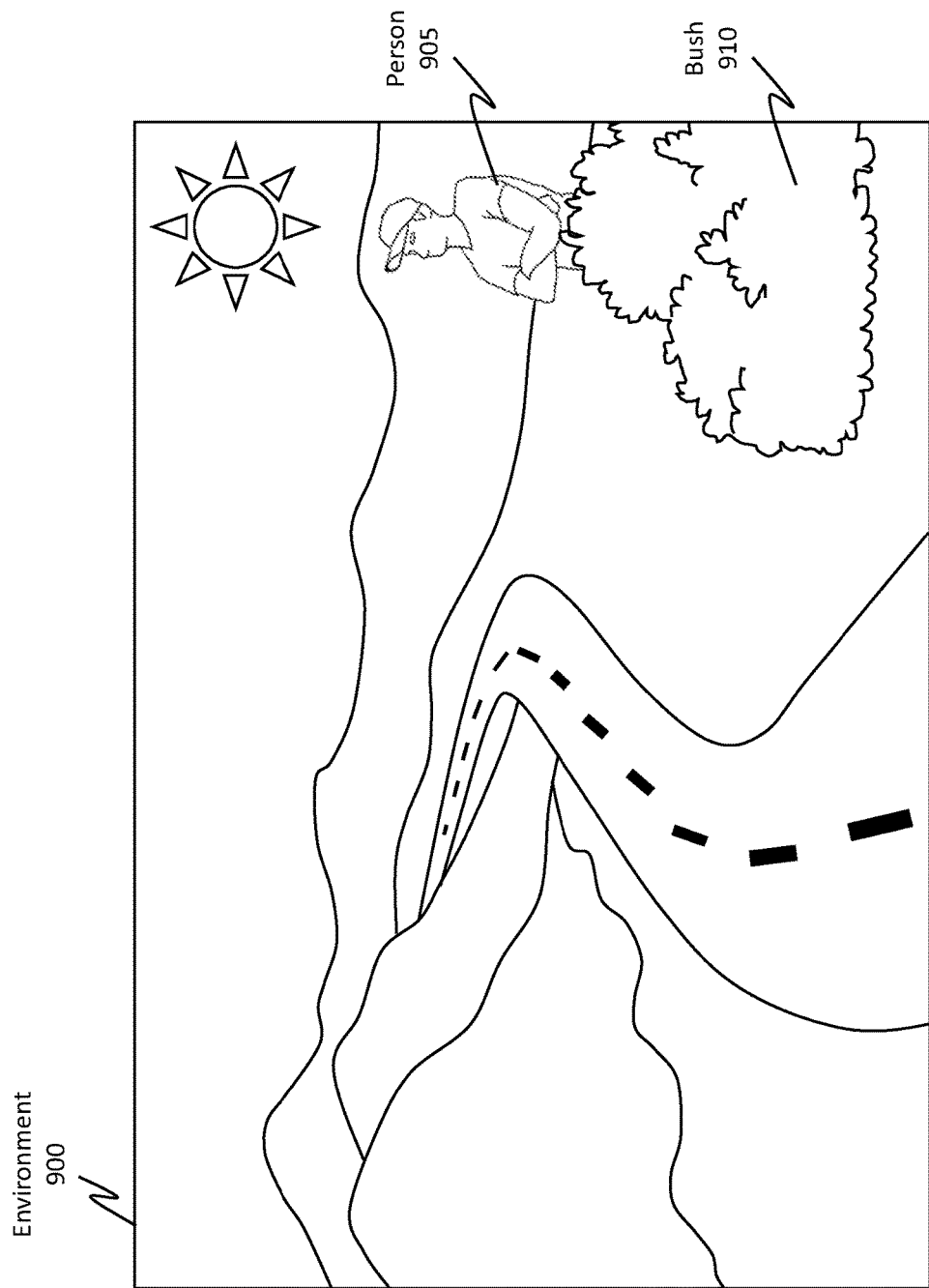
FIG. 9 illustrates an example environment in which a person is partially occluded by an obstacle and in which the person has a heat signature.
Figure 10:
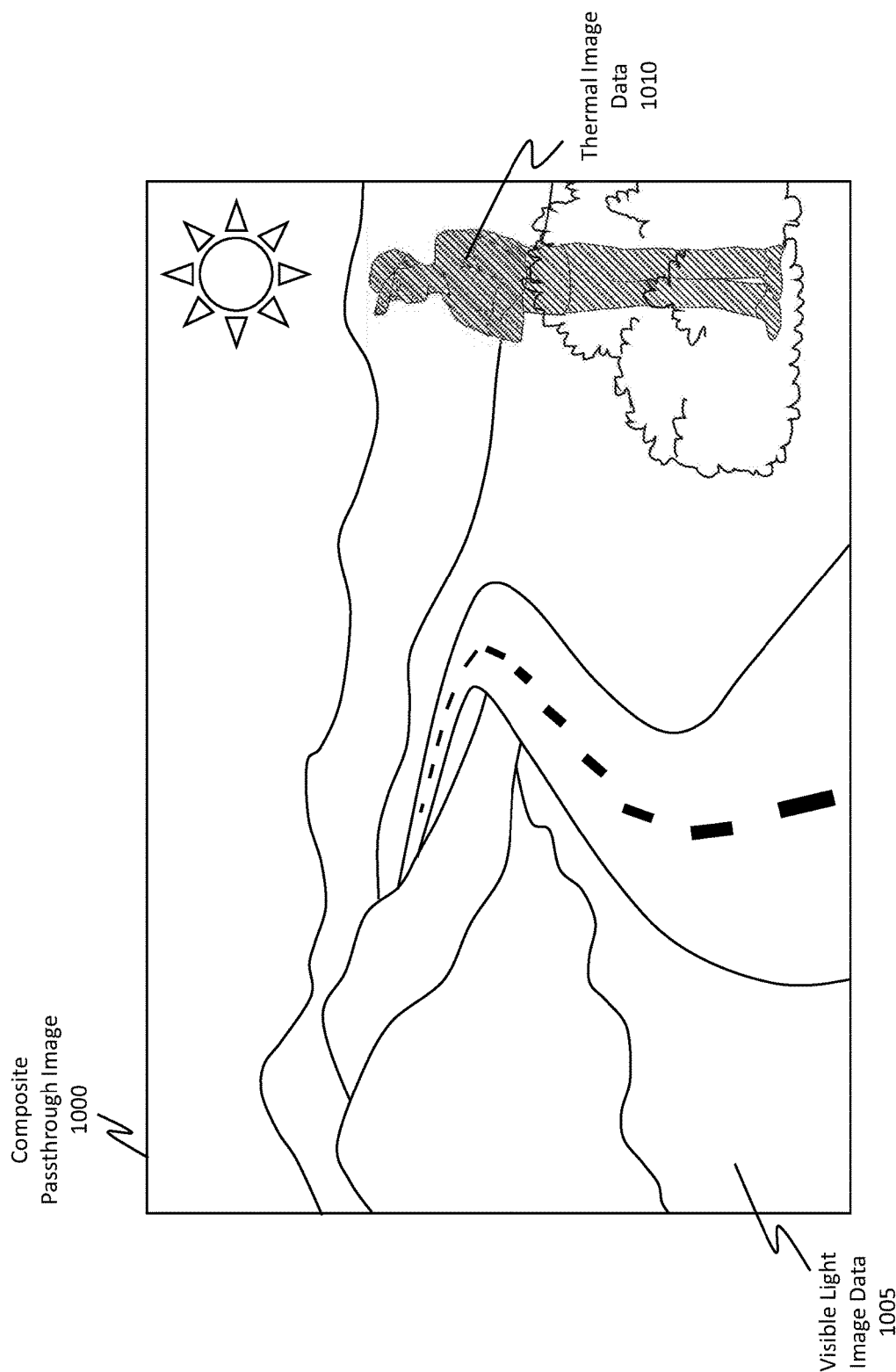
FIG. 10 illustrates how a thermal imaging camera can capture an object's heat signature and overlay that information onto a visible light passthrough image. In doing so, even if the object was occluded in some manner, the object is still viewable in the resulting passthrough image due to the use of the thermal image data.
Figure 11:
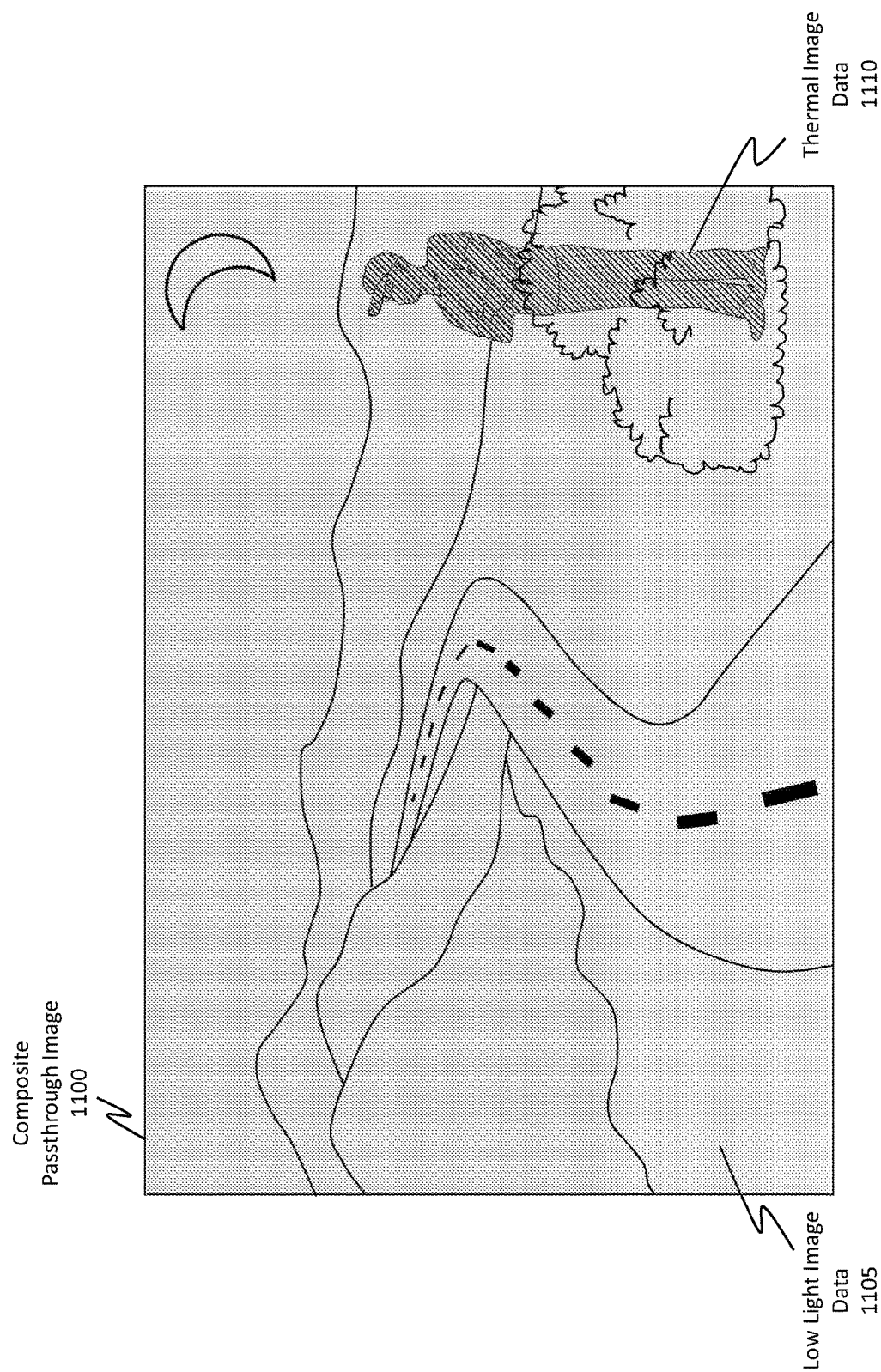
FIG. 11 illustrates how a thermal imaging camera can capture an object's heat signature and overlay that information onto a low light passthrough image.

Thereafter, act 830 includes overlaying or aligning selected portions or selected content of the warped image onto the passthrough image to generate a composite passthrough image having enhanced features. FIGS. 9 through 11 provide further detail on this overlaying operation.

Overlaying Image Content to Enhance Passthrough Images

FIG. 9 illustrates an example environment 900 that is considered a lighted environment, such as lighted environment 600 from FIG. 6A (e.g., notice the bright shining sun). A person 905 is currently present in environment 900 and is positioned at least partially behind a bush 910 (e.g., the person 905's legs are not viewable from the perspective currently illustrated in FIG. 9). Person 905 is an example of an object or entity having a heat signature that is detectable by thermal imaging cameras. Furthermore, bush 910 is an example of an obstructing or impeding object that at least partially occludes the person 905 from being visible in the visible spectrum.

Turning now to FIG. 10, this figure illustrates an example of a composite passthrough image 1000 that includes visible light image data 1005 and thermal image data 1010. This composite passthrough image 1000 is generated by performing method 700 of FIG. 7.

Composite passthrough image 1000 correlates with environment 900 from FIG. 9. That is, the content displayed in the composite passthrough image 1000 corresponds to the content included in the environment 900 as well as the perspective illustrated in FIG. 9.

Because the environment 900 is a lighted environment, the embodiments determined that the visible light cameras will be able to accurately generate passthrough images. As a result, the visible light cameras were selected and were used to generate the visible light image data 1005, which is included in the composite passthrough image 1000.

Additionally, the disclosed embodiments beneficially overlay thermal image data (e.g., thermal image data 1010) onto the visible light images. As a consequence, the composite passthrough image 1000 includes both visible light image data 1005 and thermal image data 1010.

In this example, because the thermal image data 1010 is provided in the composite passthrough image 1000, a user of the HMD will potentially be able to see the entire thermal heat signature of the person 905. As a consequence, portions of the person 905's body that might not have been clearly visible in the visible light spectrum (e.g., the person 905's legs) are now visible because of the thermal image data 1010 (e.g., the thermal signature may be able to permeate through the bush or at least through gaps in the bush). In this regard, the embodiments are able to enhance a visible light passthrough image to include additional, overlaid content, where the overlaid content may include thermal imaging data.

To clarify, when the first camera pair (e.g., the visible light cameras) is selected such that the resulting passthrough images are visible light images, thermal image data may be overlaid onto the visible light images as a result of generating the composite passthrough images. In contrast, when the second camera pair (e.g., the low light cameras) is selected such that the resulting passthrough images are low light visible and infrared images, thermal image data may be overlaid onto the infrared light images as a result of generating the composite passthrough images, as described next in FIG. 11.

FIG. 11 illustrates an example scenario in which the visibility conditions are such that the visible light cameras may not be able to generate a passthrough image having a threshold quality level. Specifically, FIG. 11 illustrates a scenario in which the environment 900 from FIG. 9 is now a low light environment. In response to determining that the visibility conditions of the low light environment indicate that low light cameras should be used to generate the passthrough images, the embodiments are able to generate the composite passthrough image 1100, which includes low light image data 1105 as well as thermal image data 1110. The dot pattern on the composite passthrough image 1100 indicates that it includes the low light image data 1105 and is distinct from the visible light image data 1005 from FIG. 10.

Similar to the scenario in FIG. 10, the person is now entirely and readily visible due to the use of the thermal image data 1110. That is, even though a bush occludes a part of the person, the person's heat signature is still detectable by the HMD's thermal imaging camera. The heat signature may be visually displayed via the thermal image data 1110, which may be overlaid on top of the low light image data 1105.

Accordingly, the disclosed embodiments are able to overlay thermal imaging data on top of other types of image data (e.g., visible light data or low light data). Additionally, while the majority of this disclosure focused on overlaying thermal imaging data onto either a visible light or a low light image, other types of data may be overlaid as well. For instance, low light image data may be overlaid onto a visible light image, and visible light data may be overlaid on a low light image. Similarly, low light image data or visible light image data may be overlaid on a thermal image. Additionally, UV image data may be overlaid on another image, or other image data may be overlaid on the UV image. Indeed, image data generated by one type of camera may be overlaid onto image data generated by another type of camera to generate an enhanced passthrough image. Additionally, multiple different types of data may be simultaneously overlaid onto an image. By way of example, both low light image data and thermal image data may be overlaid onto a visible light passthrough image, or vice versa in any combination.

Additionally, one will appreciate that when the user wearing the HMD moves and shifts perspectives, the composite passthrough images will also update accordingly.

While the examples in FIGS. 9 through 11 focused on humans and plants, one will appreciate that the principles may be applied in a broader manner. For instance, any type of object or entity with a heat signature may be detectable using the thermal imaging cameras. Examples include, but are not limited to, animals, people, vehicles, hot surfaces, heat emitting objects or tools, fire, and so forth. With regard to a first responder scenario, the embodiments are able to assist first responders in searching for and identifying injured persons as well as avoiding potentially dangerous conditions (e.g., detecting a fire behind a wall). The embodiments are able to assist with any sort of navigation, and can assist users in navigating through different environments, including lighted environments, low light environments, and even dark environments.

Figure 12:
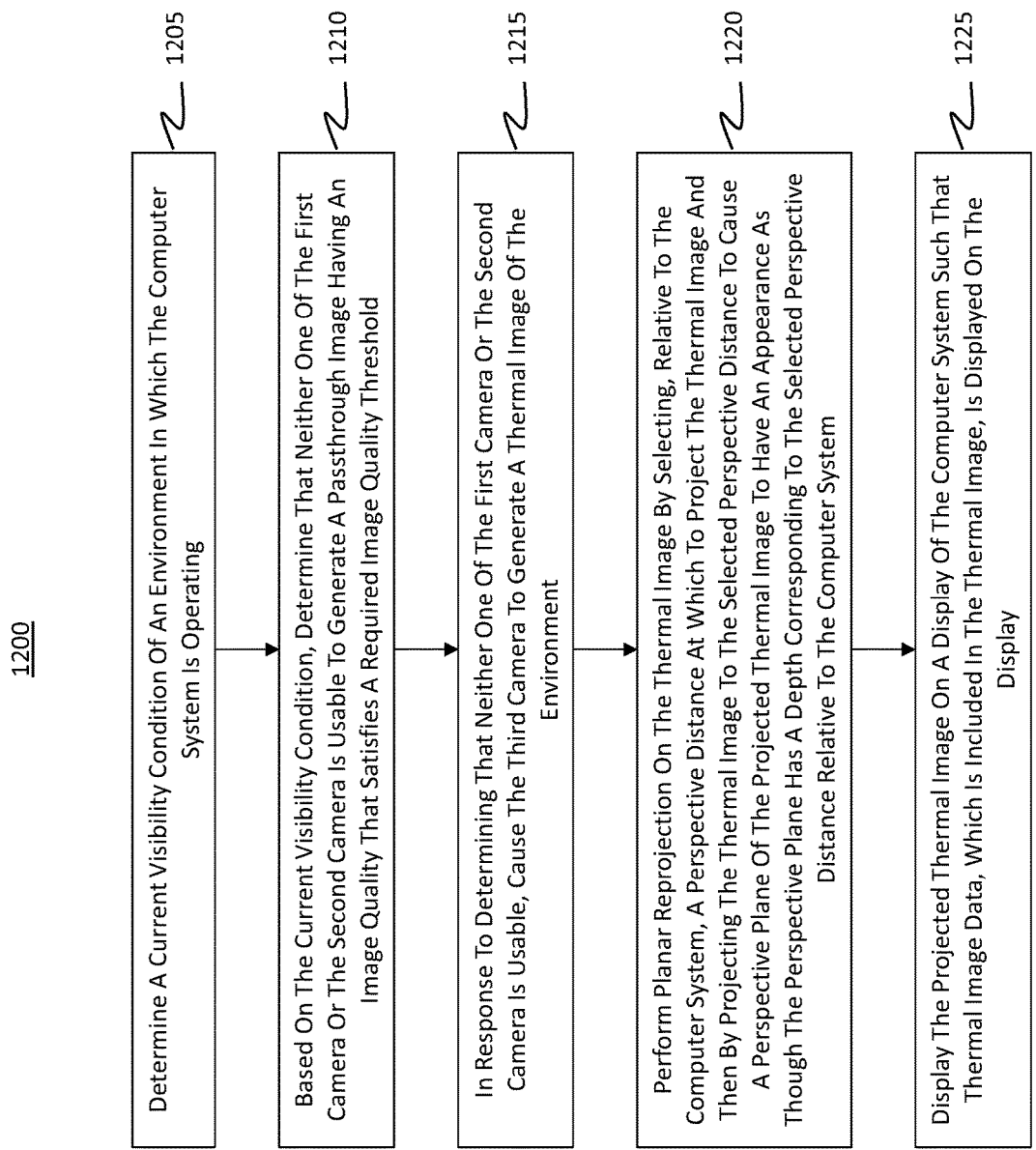
FIG. 12 illustrates a flowchart of an example method for performing planar reprojection on different types of images.

FIG. 12 illustrates another flowchart of an example method 1200 for selectively using image data to generate a passthrough image for display on an HMD. Method 1200 may be performed by any of the HMDs discussed thus far.

Similar to method 700 of FIG. 7, method 1200 also includes an act (act 1205) of determining a current visibility condition of an environment in which the computer system is operating. This operation may be performed in the manner discussed earlier.

Based on the current visibility condition, there is an act (act 1210) of determining that neither one of the first camera or the second camera is usable to generate a passthrough image having an image quality that satisfies a required image quality threshold. For instance, it may be the case that the environment is so dark that neither one of the first or second camera (e.g., the visible light camera and the low light camera) is able to generate an accurate passthrough image of the surrounding environment. In another case, the luminosity of the environment may be sufficiently high for either one of the first or second camera to detect light, but there may be some other visibility impeding substance in the environment. As an example, the environment may be filled with smoke such that the HMD is unable to track its position even though there may be light in the environment.

In some implementations, the embodiments initially generate a visible light image and then analyze the image to determine whether a passthrough image can be generated from that initial image. If not, then the embodiments may subsequently activate the low light cameras to generate a low light image and then analyze the low light image to determine whether a passthrough image can be generated from that low light image. In some embodiments, a light sensor may be used to initially determine the light conditions of the environment. If the light sensor indicates that the light is low, then an attempt may be made to use the low light cameras to generate the passthrough image. Alternatively, if the light sensor indicates the light conditions are too low, then the embodiments may refrain from using either one of the visible light cameras or the low light cameras.

In response to determining that neither one of the first camera or the second camera is usable, there is an act (act 1215) of causing the third camera to generate a thermal image of the environment. As indicate above, this operation may be performed after a visible light image has been obtained, after a low light image has been obtained, after both a visible light image and a low light image has been obtained, or after no visible light image or low light image has been obtained.

Figure 13:
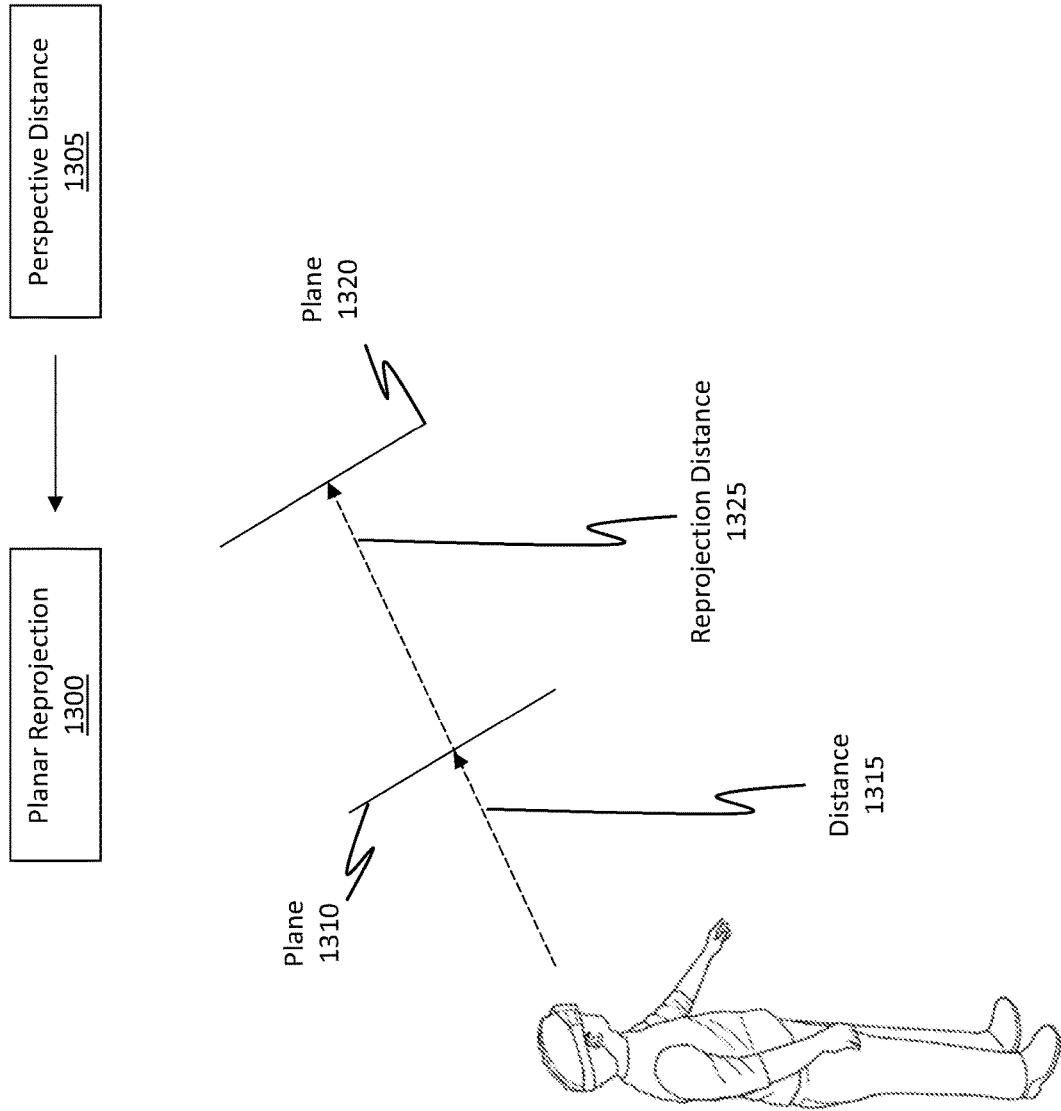
FIG. 13 illustrates a technique for selecting a perspective distance at which a plane of the thermal image is to be projected during the planar reprojection process.

Method 1200 then includes an act (act 1220) of performing planar reprojection on the thermal image. The planar reprojection is performed by selecting, relative to the computer system/HMD, a perspective distance at which to project the thermal image so as to provide depth for the thermal image. Turning briefly to FIG. 13, there is shown a planar reprojection 1300 operation in which a perspective distance 1305 is being selected. This perspective distance 1305 is the distance at which the plane of the thermal image is to be projected so as to provide at least some depth and at least some perspective to the user. The perspective distance 1305 may be a default distance, or it may be selected automatically by the HMD or selected by the user based on user input. FIG. 13 also illustrates an example in which an image is initially rendered as having a plane 1310 view at a first distance 1315 relative to the HMD. As a result of performing the planar reprojection 1300, the image is modified or reprojected to now portray the image content at a plane 1320 view having a reprojection distance 1325 (e.g., a distance farther or perhaps closer than the distance 1315). In this regard, the content presented or displayed to the user via the HMD can be reprojected at different distances in a planar manner.

Returning to FIG. 12, the planar reprojection is also performed by projecting the thermal image to the selected perspective distance. This projection process causes a perspective plane of the projected thermal image to have an appearance as though the perspective plane has a depth corresponding to the selected perspective distance relative to the computer system.

In some cases, the selected perspective distance is between about 2 meters and about 8 meters away from the computer system. In some cases, the selected distance is between about 2 meters and about 150 meters (or any range therebetween) away from the computer system. As a result, the perspective plane of the projected thermal image may have the appearance as though the perspective plane has a depth between about 2 meters and about 150 meters (or 8 meters, or any range therebetween) relative to the computer system. Of course, other perspective distances or ranges may be used as well.

Subsequently, there is an act (act 1225) of displaying the projected thermal image on a display of the computer system. As a consequence, thermal image data, which is included in the thermal image, is displayed on the display.

Accordingly, in the event that neither the visible light camera system nor the low light camera system is able to generate a passthrough image having a specific image quality, then the embodiments may resort to performing a planar reprojection process on the thermal image obtained by a thermal imaging camera. At least some of the embodiments perform a "planar" reprojection process because it is often the case that only a single thermal imaging camera is disposed on the HMD. Because only a single thermal imaging camera is on the HMD, the HMD may not be able to perform stereoscopic depth detection. Thus, the HMD resorts to performing planar reprojection using a single thermal image.

As described throughout this disclosure, the embodiments provide significant benefits and practical applications to the technical field. That is, by merging, fusing, or otherwise overlaying image data from multiple different camera types to form a composite "passthrough" image, the embodiments are able to provide enhanced information to a user to assist the user in navigating his/her environment.

One will appreciate that any feature disclosed herein may be combined with any other feature and in any combination, without limit. That is, none of the disclosed embodiments or features are mutually exclusive relative to any of the other embodiments or features. Additionally, any of the content in any of the figures may be combined with any other content in any of the other figures.

Example Computer Systems

Figure 14:
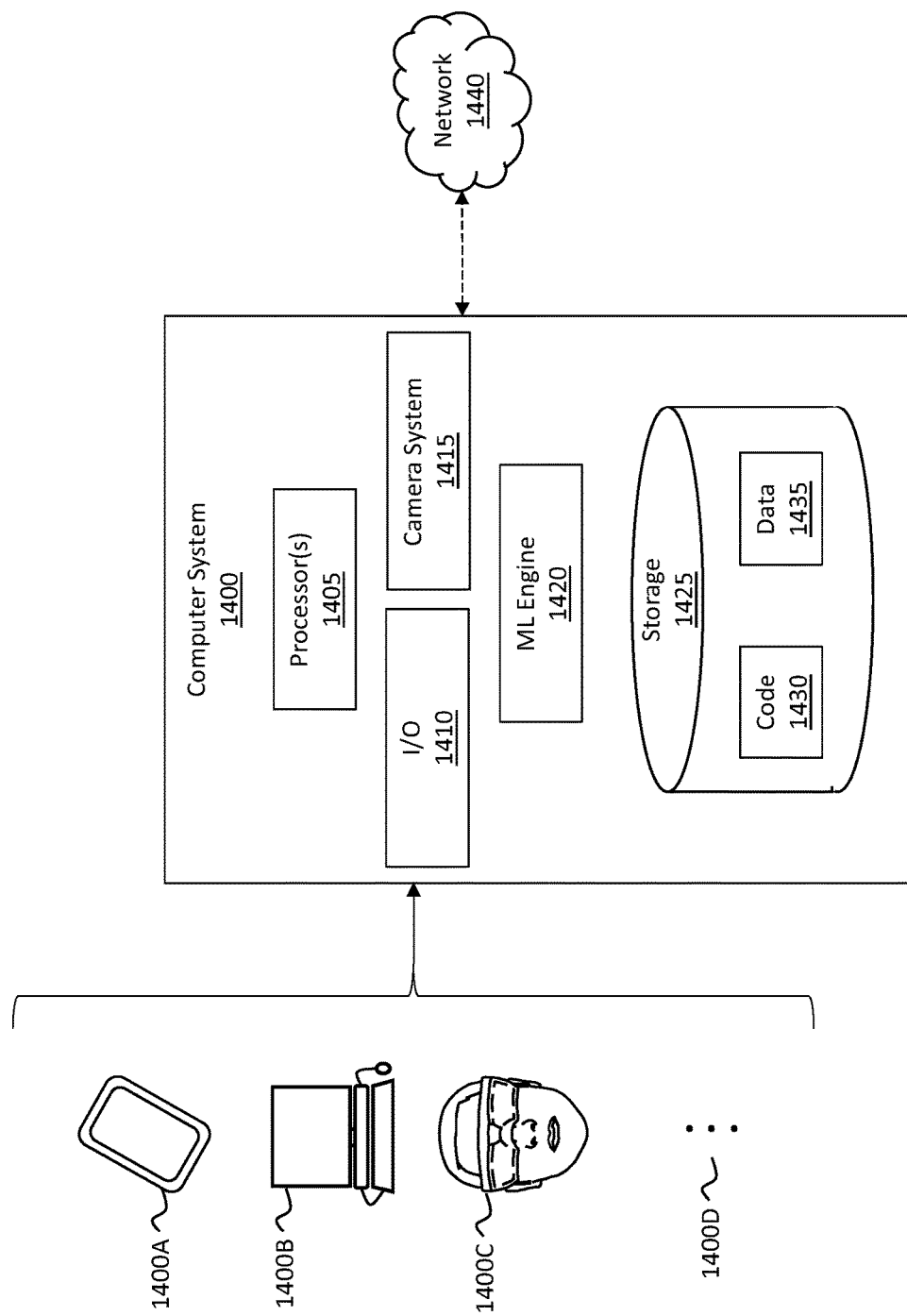
FIG. 14 illustrates an example of a computer system capable of performing any of the disclosed operations.

Attention will now be directed to FIG. 14 which illustrates an example computer system 1400 that may include and/or be used to perform any of the operations described herein. Computer system 1400 may take various different forms. For example, computer system 1400 may be embodied as a tablet, a desktop, a laptop, a mobile device, a cloud device, an HMD, or a standalone device. Computer system 1400 may also be a distributed system that includes one or more connected computing components/devices that are in communication with computer system 1400. FIG. 14 specifically calls out how computer system 1400 may be embodied as a tablet 1400A, a laptop 1400B, or an HMD 1400C (such as the HMDs discussed herein), but the ellipsis 1400D illustrates how computer system 1400 may be embodied in other forms as well.

In its most basic configuration, computer system 1400 includes various different components. FIG. 14 shows that computer system 1400 includes one or more processor(s) 1405 (aka a "hardware processing unit"), input/output (I/O) 1410, a camera system 1415, a machine learning (ML) engine 1420, and storage 1425.

Regarding the processor(s) 1405, it will be appreciated that the functionality described herein can be performed, at least in part, by one or more hardware logic components (e.g., the processor(s) 1405). That is, any of the disclosed method acts and operations may be performed by the processor(s) 1405. Illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

I/O 1410 includes any type of input or output device. Such devices include, but are not limited to, touch screens, displays, a mouse, a keyboard, HMD displays, and so forth. Any type of input or output device should be included among I/O 1410, without limitation. The HMD FOVs mentioned herein (e.g., in FIGS. 4C, 5B, and 6C) are parts of the HMD's display and are included in the I/O 1410.

Camera system 1415 may include the scanning sensor(s) 105 from FIG. 1 as well as any resources or processes used to process the scanning data. In some cases, camera system 1415 may include any number or type of depth camera or tracking camera. For instance, the cameras can include any type of thermal camera (or thermal imaging sensor), any type of visible light camera, any type of low light camera, and any type of depth detection camera. Similarly, any type of depth detector may be included among the cameras. Examples include, but are not limited to, stereoscopic cameras (both active illumination and passive (i.e. no illumination)), time of flight cameras, range finders, or any other type of range or depth sensor.

Returning to FIG. 14, the ML engine 1420 is configured to perform any of the machine learning operations disclosed herein. ML engine 1420 may be implemented as a specific processing unit (e.g., a dedicated processing unit as described earlier) configured to perform one or more specialized operations for the computer system 1400. As used herein, the terms "executable module," "executable component," "component," "module," or "engine" can refer to hardware processing units or to software objects, routines, or methods that may be executed on computer system 1400. The different components, modules, engines, and services described herein may be implemented as objects or processors that execute on computer system 1400 (e.g. as separate threads). The ML engine 1420 (or perhaps even just the processor(s) 1405) can be configured to perform any of the disclosed method acts or other functionalities.

Storage 1425 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

Storage 1425 is shown as including executable instructions (i.e. code 1430). The executable instructions (i.e. code 1430) represent instructions that are executable by the processor(s) 1405 of computer system 1400 to perform the disclosed operations, such as those described in the various methods. Storage 1425 is also shown as including data 1435. Data 1435 may include any type of data, including scanning data, pose data, deep neural network (DNN) data, depth maps, images (e.g., visible light images, low light images, thermal images), and so forth, without limitation.

The disclosed embodiments may comprise or utilize a special-purpose or general-purpose computer including computer hardware, such as, for example, one or more processors (such as processor(s) 1405) and system memory (such as storage 1425), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RANI, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras) or devices via a network 1440. For example, computer system 1400 can communicate with any number devices or cloud services to obtain or process data. In some cases, network 1440 may itself be a cloud network. Furthermore, computer system 1400 may also be connected through one or more wired or wireless networks 1440 to remote/separate computer systems(s) that are configured to perform any of the processing described with regard to computer system 1400.

A "network," like network 1440, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1440. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   a first camera structured to detect light spanning a first range of illuminance;
   a second camera structured to detect light spanning a second range of illuminance;
   a third camera structured to detect long wave infrared (IR) radiation;
   one or more processors; and
   one or more computer-readable hardware storage devices having stored thereon computer-executable instructions that are executable by the one or more processors to cause the computer system to:
   determine a current visibility condition of an environment in which the computer system is operating;
   based on the current visibility condition, select one of the first camera or the second camera to generate a passthrough image of the environment, which passthrough image is to be displayed on a display of the computer system;
   cause the selected one of the first camera or the second camera to generate the passthrough image of environment and cause the third camera to generate a thermal image of the environment;
   perform parallax correction by aligning coordinates of the thermal image with corresponding coordinates identified within the passthrough image; and
   display at least a portion of the parallax-corrected thermal image on the display.

2. The computer system of claim 1, wherein determining the current visibility condition is performed by determining a quality of a depth map generated based on images that are obtained using the first camera in combination with another camera of a same type as the first camera.

3. The computer system of claim 1, wherein determining the current visibility condition is performed by receiving user input, the user input causing the second camera to be activated.

4. The computer system of claim 1, wherein determining the current visibility condition is performed by determining whether the computer system is able to locate itself within the environment using the first camera.

5. The computer system of claim 1, wherein activating or deactivating the second camera is performed via a user-controlled switch.

6. The computer system of claim 1, wherein, as a result of performing the parallax correction, a perspective of the thermal image is aligned with a perspective of the passthrough image.

7. The computer system of claim 1, wherein the first camera, which is structured to detect light spanning the first range of illuminance, is a visible light camera, and wherein the first range of illuminance begins at about 10 lux and increases beyond 10 lux.

8. The computer system of claim 1, wherein the second camera, which is structured to detect light spanning the second range of illuminance, is a low light camera sensitive to visible light and infrared light, and wherein the second range of illuminance is between about 1 milli-lux and about 10 lux.

9. The computer system of claim 1, wherein the third camera is a long wave infrared imaging camera structured to detect electromagnetic radiation by measuring long wave infrared wavelengths.

10. The computer system of claim 1, wherein the first camera is one of a pair of low power visible light head tracking cameras, wherein the second camera is one of a pair of low light cameras, and wherein the third camera is a single long wave infrared imaging camera.

11. A method for correcting parallax between images captured by multiple different types of cameras included within a computer system, said method comprising:
   determining a current visibility condition of an environment in which the computer system is operating;
   based on the current visibility condition, selecting one of a first camera pair of the computer system or a second camera pair of the computer system to generate passthrough images of the environment, which passthrough images are to be displayed on a display of the computer system;
   causing the selected one of the first camera pair or the second camera pair to generate the passthrough images of environment and causing a third camera to generate a thermal image of the environment;
   performing parallax correction by reprojecting coordinates of the thermal image with corresponding coordinates identified within the passthrough images;
   subsequent to performing the parallax correction, overlaying at least some selected portions of the parallax-corrected thermal image onto the passthrough images to generate composite passthrough images; and
   displaying the composite passthrough images on the display.

12. The method of claim 11, wherein, prior to performing the parallax correction, one or more epipolar transforms are applied to a pair of initial camera images to generate the passthrough images to ensure the passthrough images are aligned with pupils of a user who is operating the computer system such that the coordinates of the thermal image are aligned with the corresponding coordinates of the passthrough images after the passthrough images, including the passthrough images' coordinates, are generated using the one or more epipolar transforms.

13. The method of claim 11, wherein the first camera pair is selected when the current visibility condition indicates that an ambient light measurement of the environment satisfies an ambient light threshold, and wherein the second camera pair is selected when the current visibility condition indicates that the ambient light measurement fails to satisfy a signal-to-noise threshold of the first camera pair.

14. The method of claim 11, wherein the first camera pair is selected, the first camera pair being visible light cameras such that the passthrough images are visible light images, wherein, as a result of generating the composite passthrough images, thermal image data is overlaid on the visible light images, and wherein a stereo depth map is generated based on images generated by the first camera pair, the stereo depth map being used for performing the parallax correction.

15. The method of claim 11, wherein the second camera pair is selected, the second camera pair being low light visible and infrared cameras such that the passthrough images are low light visible and infrared images, and wherein, as a result of generating the composite passthrough images, thermal image data is overlaid on the infrared light images.

16. The method of claim 11, wherein the current visibility condition indicates that a detected texture of the environment is below a texture threshold or, alternatively indicates that a detected light condition of the environment is below a light threshold.

17. The method of claim 11, wherein the first camera pair are visible light cameras, the second camera pair are low light visible and infrared cameras, and the third camera is a thermal imaging camera.

18. The method of claim 11, wherein, when the second camera pair is not selected based on the current visibility condition, the second camera pair is caused to operate in a powered-down state.

19. A computer system comprising:
   a first camera structured to detect light spanning a first range of illuminance;
   a second camera structured to detect light spanning a second range of illuminance;
   a third camera structured to detect long wave infrared radiation;
   one or more processors; and
   one or more computer-readable hardware storage devices having stored thereon computer-executable instructions that are executable by the one or more processors to cause the computer system to:
   determine a current visibility condition of an environment in which the computer system is operating;
   based on the current visibility condition, determine that neither one of the first camera or the second camera is usable to generate a passthrough image having an image quality that satisfies a required image quality threshold;
   in response to determining that neither one of the first camera or the second camera is usable, cause the third camera to generate a thermal image of the environment;
   perform planar reprojection on the thermal image by selecting, relative to the computer system, a perspective distance at which to project the thermal image and then by projecting the thermal image to the selected perspective distance to cause a perspective plane of the projected thermal image to have an appearance as though the perspective plane has a depth corresponding to the selected perspective distance relative to the computer system; and display the projected thermal image on a display of the computer system such that thermal image data, which is included in the thermal image, is displayed on the display.

20. The computer system of claim 19, wherein the selected perspective distance is between about 2 meters and about 150 meters away from the computer system such that the perspective plane of the projected thermal image has the appearance as though the perspective plane has a depth between about 2 meters and about 150 meters relative to the computer system.

* * * * *